US012657254B2

(12) United States Patent
Li et al.

(10) Patent No.: US 12,657,254 B2
(45) Date of Patent: Jun. 16, 2026

(54) PRIME-NUMBER-BASED PARALLEL SOLVER FOR ENGINEERING DESIGN OPTIMIZATION PROBLEMS OF POLYNOMIAL FORMS WITH INTEGER VARIABLES

(71) Applicant: City University of Hong Kong, Hong Kong (HK)

(72) Inventors: Han-Lin Li, Hsinchu (TW); Way Kuo, Hong Kong (HK); Frank Youhua Chen, Hong Kong (HK); Mingming Wang, Hong Kong (HK)

(73) Assignee: City University of Hong Kong, Hong Kong (CN)

( * ) Notice: Subject to any disclaimer, the term of this patent is extended or adjusted under 35 U.S.C. 154(b) by 1058 days.

(21) Appl. No.: 17/664,897

(22) Filed: May 25, 2022

(65) Prior Publication Data

US 2023/0385365 A1     Nov. 30, 2023

(51) Int. Cl.
*G06F 17/11*     (2006.01)
*G06F 9/38*     (2018.01)

(52) U.S. Cl.
CPC ............ *G06F 17/11* (2013.01); *G06F 9/3885* (2013.01)

(58) Field of Classification Search
CPC ...... G06F 17/11; G06F 9/3885; G06F 9/5027; G06F 2209/5017
See application file for complete search history.

(56) References Cited

U.S. PATENT DOCUMENTS

| | | | | |
|---|---|---|---|---|
| 2002/0191534 | A1* | 12/2002 | Silvers | H04L 27/2602 |
| | | | | 370/206 |
| 2011/0314448 | A1* | 12/2011 | Biggerstaff | G06F 8/76 |
| | | | | 717/114 |
| 2020/0202058 | A1* | 6/2020 | Yu | G06N 20/10 |

OTHER PUBLICATIONS

Kruskal, Clyde P., and Alan Weiss. "Allocating independent subtasks on parallel processors." IEEE Transactions on Software engineering 10 (2006): 1001-1016. (Year: 2006).*
Geoffrion , A. M., 1967. Integer Programming by Implicit Enumeration and Balas' Method. SIAM Rev., 9(2), p. 178-190.
Kitayama S., Arakawa M., Yamazaki K (2012). Discrete differential evolution for mixed discrete non-linear problems. Journal of Civil Engineering and Architecture 6:594-605.
Lei, G. et al., 2017. A Review of Design Optimization Methods for Electrical Machines. vol. 10, p. 1962.
(Continued)

*Primary Examiner* — Saif A Alhija
(74) *Attorney, Agent, or Firm* — Matthew M. Hulihan, Esq.; Heslin Rothenberg Farley & Mesiti P.C.

(57)     ABSTRACT
Received is a main program representing one Engineering Design Optimization Problem (EDOP), the EDOP including polynomial terms with product values. A number (N) of available parallel processors for parallel processing are identified. The main program is partitioned into N subprograms, N being a positive integer greater than one. The N subprograms have fewer overlapping product values between them compared to existing solutions, and the partitioning is prime-number based. Each of the available parallel processors then independently solve a unique subprogram of the N subprograms, resulting in N unique solutions. A best solution is automatically chosen from among the N unique solutions and the best solution is automatically applied to the EDOP.

27 Claims, 5 Drawing Sheets

(56) References Cited

OTHER PUBLICATIONS

Li et al., 2020. A Prime-Logarithmic Method for Optimal Reliability Design. IEEE Transactions on Reliability, 70(1), 146-162.

Lin, H. M., Tsai, F. J. & Yu, S. C., 2012. A Review of Deterministic Optimization Methods in Engineering and Management. Mathematical Problems in Engineering, vol. 12.

Malapert, A., Regin, J. C. & Rezgui, M., 2016. Embarrassingly Parallel Search in Constraint Programming. J. Artif. Intell. Res., vol. 57, pp. 421-464.

Patel et al. Dec. 2018. Optimization of mechanical design problems using advanced optimization technique. In OP Conference Series: Materials Science and Engineering (vol. 455, No. 1, p. 012091). IOP Publishing.

Rajeev, S. & Krishnamoorthy, S. C., 1992. Discrete Optimization of Structures Using Genetic Algorithms. Journal of Structural Engineering, 118(5).

Ralphs, T., Shinano, Y., Berthold, T. & Koch, T., 2018. Parallel Solvers for Mixed Integer Linear Optimization. In: Handbook of Parallel Constraint Reasoning. s.l.:Springer, Cham, pp. 283-336.

Sandgren, E., 1990. Nonlinear Integer and Discrete Programming in Mechanical Design Optimization. J. Mech. Des., 112(2), pp. 223-229.

Shin, D. K., Gurdal, Z. & Griffin O. H., 1989. A Penalty Approach for Nonlinear Optimization with Discrete Design Variables. s.l. :Springer, Berlin, Heidelberg.

Wikipedia https://en.wikipedia.org/wiki/Prime_number_theorem, accessed on Jan. 24, 2022.

* cited by examiner

400

410        440        420

430        430

500

510        520

550

530        540

PRIME-NUMBER-BASED PARALLEL SOLVER FOR ENGINEERING DESIGN OPTIMIZATION PROBLEMS OF POLYNOMIAL FORMS WITH INTEGER VARIABLES

BACKGROUND

Design Optimization, also known as Engineering Optimization, is a mathematical technique that seeks to support selecting the optimal design among many alternatives. In general, design optimization determines values for design variables (or parameters) such that an objective function is optimized while combinations of variables expressed as equalities or inequalities must be satisfied for any acceptable design alternative.

SUMMARY

Shortcomings of the prior art are overcome, and additional advantages are provided through the provision of a computer-implemented method for facilitating processing within a computing environment. The method includes receiving a main program representing one Engineering Design Optimization Problem (EDOP), wherein the one EDOP comprises polynomial terms with product values; identifying a number (N) of available parallel processors for parallel processing; partitioning the main program into N subprograms, wherein N is a positive integer greater than one, and wherein the partitioning is prime-number based; solving, by each of the available parallel processors independent of any other processor, a unique subprogram of the N subprograms, the solving resulting in N unique solutions; automatically choosing a best solution from among the N unique solutions; and automatically applying the best solution to the EDOP.

Computer program products and computer systems relating to one or more aspects are also described and claimed herein. Further, services relating to one or more aspects are also possible.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
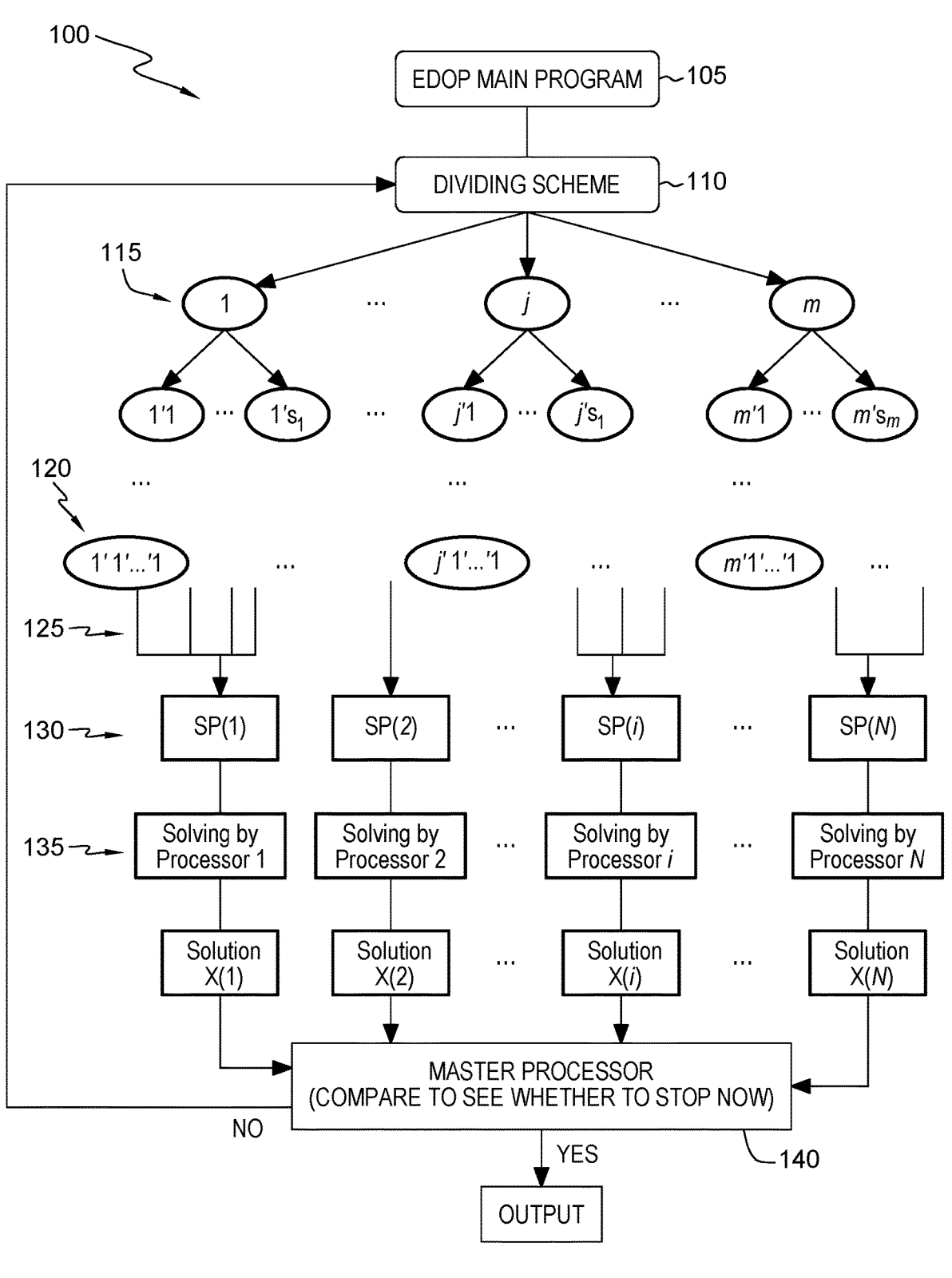
FIG. 1 is a high-level flow diagram for one example of solving an EDOP using branch-cut parallel solvers, in accordance with one or more aspects of the present invention.

In one or more aspects, a capability is provided to facilitate processing within a computing environment.

Engineering Design Optimization Problems (EDOPs) are common in, for example, engineering design and resource management. Owing to the popularity of online multiple-core CPUs, many EDOP parallel solvers have been developed in recent times. However, these parallel solvers have met with only relatively modest success. One issue with parallel solvers is how to develop a parallel algorithm to partition a main program into several subprograms effectively. A goal of the present invention is, for example, to partition the main program into subprograms that are independent of each other, thus saving much communication time among subprograms, as compared to existing parallel solvers.

A prime number is the root of integers. Based on the theorem of prime numbers, this invention provides a parallel solver, refered to herein as "PARA235", to solve EDOP problems parallelly. Given an EDOP problem, suppose there are N available processors ((local and/or remote physical processors) and/or (local and/or remote virtual processors)), PARA235 can partition this EDOP problem into N independent subprograms. Each subprogram is assigned to a unique processor. Thus, the N subprograms can be solved without, for example, communicating or waiting during the solving process. PARA235 automatically finds the optimal solution from the N subprograms for the original EDOP problem.

In one embodiment, there may be a central processor involved, the central processor (CP) having, for example, two duties. First, the CP divides an EDOP into a number of subproblems and then assigns each of these subproblems to one of the parallel processors. Second, after receiving solutions from all parallel processors, the CP chooses the best solution, which will be an optimal solution of the EDOP. There is no interaction between the CP and the parallel processors while they are solving the subproblems. That is, each parallel processor solves its assigned subproblem independently, without communicating with the CP or interacting with other parallel processors.

As used herein, the term "subproblem" refers to a portion of an EDOP divided from a main problem. For purposes herein, the terms "main problem" and "EDOP" can be thought of as synonymous.

As used herein, the term "main program" refers to a computer program (or code) representing one EDOP.

As used herein, the term "subprogram" refers to computer program (or code), or an integer or mixed-integer program (or code) used to solve a subproblem.

As used herein, the term "product values" refers to both integer product values and non-integer product values. The (decision) variables can be integer-valued or discrete-valued. When a variable takes integer values, it can be positive or negative. However, when a vallue is chosen from a list of choices, the variable need not be integer-valued; e.g., the diameter size can only be chosen from a list of standardized sizes, for example, 10.8, 12.5, 16.4. As such, the resulting product values may not be integer-valued. This is shown in some of the examples.

Normally, an EDOP contains some polynomial terms composed of integer variables. To simplify the expression, here the focus is on solving an EDOP where each polynomial term contains up to three variables, as descibed in (1):

$$EDOP: \text{Minimize } F(X) = \sum_{h=1}^{h'} \sum_{i,j,k} a_{ijk,h} x_i^{\alpha_{i,h}} x_j^{\beta_{j,h}} x_k^{\gamma_{k,h}} \quad (1)$$

where $X = (x_1, x_2, \ldots, x_n)$, $X \in$ Feasible set, $x_l \in \{1, 2, \ldots, m\}$, for $l = 1, 2, \ldots, n$, $x_l$ are decision variables with posiible values $1, 2, \ldots, m$, $\alpha_{i,h}, \beta_{j,h}, \gamma_{k,h}$ are non−negative integer constants, and $$x_i^{\alpha_{i,h}} x_j^{\beta_{j,h}} \text{ and } x_i^{\alpha_{i,h}} x_j^{\beta_{j,h}} x_k^{\gamma_{k,h}}$$

are called the two-variables cross term and three-variables cross term respectively. The cross-terms such as $$x_1 x_2, x_1 x_2^2, x_1 x_2^3, \text{ and } x_1^2 x_2^3$$

are called terms with the same variables. Similarly, the cross-terms such as $$x_1 x_2 x_3, x_1 x_2 x_3^2, x_1 x_2^2 x_3^2, \text{ and } x_1 x_2^2 x_3^3$$

are also called terms with the same variables. To simplify the expression here, all variables have the same value domain $\{1,2, \ldots, m\}$. There are two competing parallel approaches for solving an EDOP, the branch-cut method and the enumeration method.

The Branch-Cut Method is discussed first. Many of current parallel computing solvers solve EDOPs by the Branch-Cut Method, described with respect to flow diagram 100, in which an EDOP main program 105 is divided using a dividing scheme 110, as depicted in FIG. 1. The dividing scheme first generates a branching tree 115 with hierarchical nodes 120. Then, using a cut to divide the nodes 125 into several clusters, some clusters are grouped as a subprogram 130. Each subprogram is assigned to a processor 135. There is a Master Processor 140 to bridge the interactions of processors. Current EDOP parallel solvers frame 100 is depicted in FIG. 1, where there are several nodes, such as nodes 105, 110 and 115, which are clustered as N subprograms. Each subprogram is assigned to one of N processors. There is a master processor, adjusting the temporary solutions of these N processors, then to reiterate the process (a "no" from the comparison by the Master Processor) of partitioning the EDOP into another set of subprograms until reaching the optimal solution, or ending once one or more of certain termination rules have been met, which yields a not necessarily optimal solution. As previously noted, each of the processors may be physical or virtual, and may be locally situated or remotely situated.

Three deficiencies of such a branch-cut frame include, for example, (i)-(iii) below:

(i) The difficulty for partitioning programs: Current parallel solver is hard to partition EDOP in (1) into subprograms systematically. Because a branch-cut algorithm is a randomly generating process and is difficult to control the number of generated nodes. There lacks a clear idea about how many subprograms are proper.

(ii) The difficulty for intercommunications: The communication messages among processors are hard to specify for reaching better solutions. Many experimental reports show that most of the computing time for the current parallel solvers has been spent on "waiting" and "communication".

(iii) The difficulty to reach an optimal solution: Owing to the above two difficulties, it is hard for the Master processor to systematically assign tasks to multiple processors to ensure the obtained solution is an optimal solution of an EDOP.

Non-limiting examples of Enumeration Methods include the Parallel Implicit Enumeration Method and the Embarrassingly Parallel Method. These methods are collectively referred to as the "Enumeration Method" herein. The Enumeration Method first divides $x_i (i=1,2, \ldots n)$ of EDOP (1) into some clusters, then combines these clusters into many subprograms. The Enumeration Method is capable of dividing the main program into subprograms. However, there is an excessive number of overlapping product values among these subprograms, which means adding more continuous variables and constraints to the linearized product value.

Below is a simple example to explain why PARA235 is more effective than the Enumeration Method to solve EDOPs.

Simple Example: Consider an EDOP expressed as:

| Main Program | Min | $F(X) = a_{12}x_1x_2 + a_{13}x_1x_3 + a_{22}x_2x_3$ |
|---|---|---|
| | Subject to | $X = (x_1, x_2, x_3)$, $X \in$ Feasible set, |
| | | $a_{12}, a_{13}$ and $a_{23}$ are constants, |
| | | and $x_i \in 2,3, \ldots, 10$, for $i = 1,2,3$. |

Suppose there are 8 available processors, for example, locally situated or online or remote using physical and/or virtual processors. Since there are three different variables $x_1$, $x_2$ and $x_3$ which have the same domain set, the domain set is divided into two sets A and B ($2^3=8$)—see Table 1 below. Then the Main Program can be divided into 8 subprograms SP(1), SP(2), . . . , SP(8).

| SP(1) becomes | Min | $F(X) = a_{12}x_1x_2 + a_{13}x_1x_3 + a_{22}x_2x_3$ |
|---|---|---|
| | Subject to | $X = (x_1, x_2, x_3)$, $X \in$ Feasible set, |
| | | and $x_1, x_2, x_3 \in A$. |
| SP(2) becomes | Min | $F(X) = a_{12}x_1x_2 + a_{13}x_1x_3 + a_{22}x_2x_3$ |
| | Subject to | $X = (x_1, x_2, x_3)$, $X \in$ Feasible set |
| | | and $x_1, x_2 \in A$, $x_3 \in B$. |
| ... | | |
| SP(8) becomes | Min | $F(X) = a_{12}x_1x_2 + a_{13}x_1x_3 + a_{22}x_2x_3$ |
| | Subject to | $X = (x_1, x_2, x_3)$, $X \in$ Feasible set, |
| | | and $x_1, x_2, x_3 \in B$. |

Table 1 shows the list of value domains of $x_1$, $x_2$, $x_3$, $x_1 x_2$, $x_1 x_3$, and $x_2 x_3$ for each of the 8 subprograms. Following Table 1 below is an explanation as to how A and B may be constructed, in one example.

TABLE 1

| subproblems | variables' domains of | | | variables' domains of | | |
|---|---|---|---|---|---|---|
| | $x_1$ | $x_2$ | $x_3$ | $x_1x_2$ | $x_1x_3$ | $x_2x_3$ |
| SP(1) | A | A | A | C | C | C |
| SP(2) | A | A | B | C | D | D |
| SP(3) | A | B | A | D | C | D |
| SP(4) | B | A | A | D | D | C |
| SP(5) | B | B | A | E | D | D |
| SP(6) | B | A | B | D | E | D |
| SP(7) | A | B | B | D | D | E |
| SP(8) | B | B | B | E | E | E |

For the Enumeration Method, the sets A and B are divided as evenly as possible, for example, A={2,3,4,5,6} and B={7, 8,9,10}. This results in:

$$C = A \times A = \{4, 6, 8, 9, 10, 12, 15, 16, 18, 20, 24, 25, 30, 36\}$$

$$D = A \times B = \left\{ \begin{array}{l} 14, 16, 18, 20, 21, 24, 27, 28, 30, \\ 32, 35, 36, 40, 42, 45, 48, 50, 54, 60 \end{array} \right\}$$

$$E = B \times B = \{49, 56, 63, 64, 70, 72, 80, 81, 90, 100\}$$

where the number of elements in each sets are:

$$|A| = 5, |B| = 4, |C| = 14, |D| = 19, |E| = 10.$$

It is worth noting that even for such a simple case, there are heavy overlapping values among sets. For instance, C and D have overlapping values {16,18,20,24,30,36}. The overlapping situation will become heavier if the function F(X) is of higher-order polynomial terms such as $x_1x_2x_3$ or $$x_1x_2x_3^2.$$

The heavy overlapping situation implies that the subprograms will contain many unnecessary product terms, which causes a heavy computation burden and degrades performance.

The above is constrasted, in one or more aspects, with the approach of the present invention. For example, the prime number that consists of {2,3,4,5,6,7,8,9,10} are {2,3,5,7}. The present invention forms, for example, the first cluster A as A={2,4,7,8} in which the elements' maximum prime factor is 2 or 7. Similarly, a second cluster B as B={3,5,6, 9,10} in which the elements' maximum prime factor is 3 or 5. The primes are clustered to keep the elements in each cluster as equal as possible, allowing the forming of sets C, D, and E as:

$$C = A \times A = \{4, 8, 14, 16, 28, 32, 49, 64\}$$

$$D = A \times B = \{16, 10, 12, 18, 20, 21, 24, 35, 36, 40, 42, 48, 63, 70, 72, 80\}$$

$$E = B \times B = \{9, 15, 18, 25, 27, 30, 36, 45, 50, 54, 60, 81, 90, 100\},$$

where the number of elements in each set are:

$$|A| = 4, |B| = 5, |C| = 8, |D| = 16, |E| = 14.$$

It is worth noting that there are less overlapping values among sets C, D, and E, in stark constrast to the Enumeration Method. That is, |C|+|D|+|E|=43 in the Enumeration Method but only 38 here. This gap will get much larger as the domain becomes larger. Given the fact that the CPU time rises rapidly with the growth of the size of the value set, the advantage of our method will be more evident.

Comparing PARA235 with the Branch-cut Method and the Enumeration Method, PARA235 has the following distinguishing features:

(i) Partitioning: The Branch-Cut Method cannot partition the Main Program into independent subprograms, due to the excessive communications, while the Enumeration Method may partition the Main Program into subprograms, but the subprograms contain many overlapping product values. However, PARA235 can partition the Main Program into independent subprograms, where there are less overlapping product values among these subprgrams.

(ii) Computation: Branch-Cut Method spends a lot of time waiting and communicating in solving its subprograms. The Enumeration Method wastes time on treating heavily overlapping product terms in solving its subprograms. However, PARA235 can solve its subprograms simultaneously and independently.

(iii) Evaluation: Branch-Cut Method requires evaluating its solution process to obtain the optimal global solution. The Enumeration Method needs to check whether many subprograms have the same solution. However, PARA235 can automatically ensure that the best solution found by its subprograms is indeed the optimal global solution of the Main Program.

Continuing with PARA235, Denote four parameters N, Q, D=($d_1$, $d_2$, . . . , $d_Q$), and $\alpha$=($\alpha_1$, $\alpha_2$, . . . , $\alpha_Q$), as follows:

Let N be the number of available online processors. See 215 in FIG. 2.

Let Q be the total number of variables in (1). See 210 in FIG. 2.

Let D=($d_1$, $d_2$, . . . , $d_Q$) be the domains of Q variables. See 210 in FIG. 2.

Let $\alpha$=($\alpha$1, $\alpha$2, . . . , $\alpha$Q) be a vector with positive integer components satisfying $$\prod_{i=1}^{Q} \alpha_i \le N \text{ and } \alpha_i \le |d_i|, i = 1, 2, \ldots, Q.$$

Figure 2:
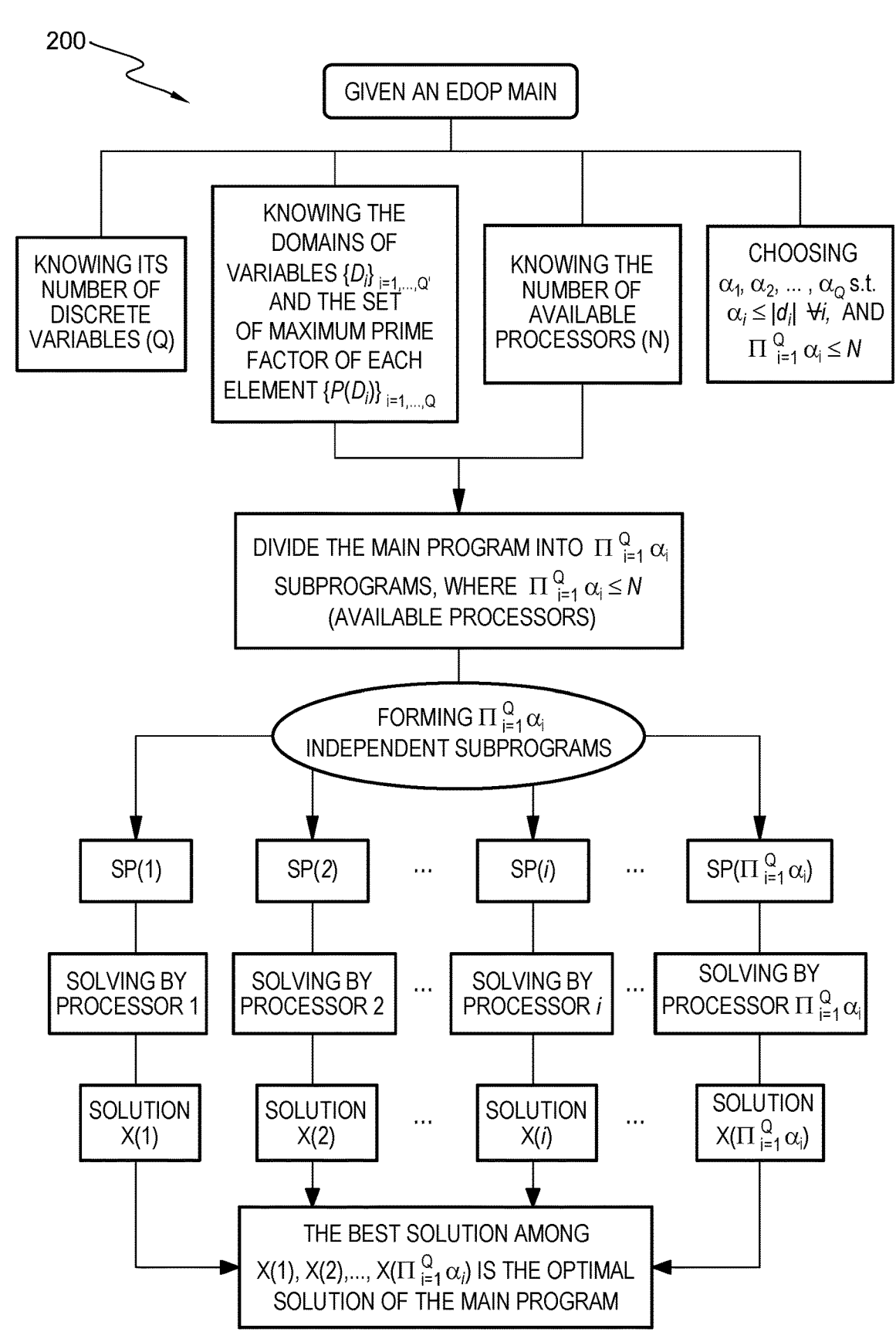
FIG. 2 is a high-level flow diagram for one example of a method of solving an EDOP, in accordance with one or more aspects of the present invention.

See 220 in FIG. 2.

The steps of solving the EDOP in (1) by PARA235 are illustrated and described below, in conjunction with the flow diagram 200 of FIG. 2 and using the above parameters:

Step 1. Input N, Q, D=($d_1$, $d_2$, . . . , $d_Q$), and $$\alpha = \left( \alpha_1, \alpha_2, \ldots, \prod_{i=1}^{Q} \alpha_i \right)$$

See 205, 210, 215 and 220 in FIG. 2.

Step 2. Partitioning the EDOP in (1) into $$\prod_{i=1}^{Q} \alpha_i$$

independent subprograms SP(1), SP(2), . . . , $$SP\left(\prod_{i=1}^{Q} \alpha_i\right), \prod_{i=1}^{Q} \alpha_i \leq N$$

and $\alpha_i \leq |d_i|, i=1,2, \ldots, Q$. See 220, 225 and 230 in FIG. 2.
 Step 3. Solving SP(1), SP(2), . . . , $$SP\left(\prod_{i=1}^{Q} \alpha_i\right)$$

simultaneously, where SP(i) is solved by processor i. Let the solution be X(1), X(2), . . . , $$X\left(\prod_{i=1}^{Q} \alpha_i\right).$$

See 235 in FIG. 2.
 Step 4. The best of X(1), X(2), . . . , $$X\left(\prod_{i=1}^{Q} \alpha_i\right)$$

is then the optimal soulution of EDOP in (1). See 240 in FIG. 2.
 Note that the subproblems SP(1), SP(2), . . . , $$SP\left(\prod_{i=1}^{Q} \alpha_i\right)$$

are independent from each other. That means all subproblems have different optimal solutions. In other words, X(k) ≠X(k') for k≠k' where $$k, k' \in \left\{1, 2, 3, \ldots, \prod_{i=1}^{Q} \alpha_i\right\}.$$

This will be proven in Theorem 1 and Theorem 2 below.
 In another aspects of the invention, disclosed is a prime-number-based method for order-two products. Consider a positive integer domain set D={$d_1$, $d_2$, . . . , $d_M$}, $d_i \leq 0$, i=1,2, . . . , M, and denote P(D) as the set of prime numbers which are the maximum prime factors of elements in D, expressed as:

$$P(D) = \{p_1, p_2, \ldots, p_m\}, \tag{2}$$

$p_1 < p_2 < \ldots < p_m.$ Note that P(D) is defined at 210 in FIG 2.

Denote $C(p_l t)$ as a "cluster $P_l$ set" composed of all integers in $P_l$ cluster, specified as:

$$C(p_l) = \{d = r_k \times p_l \in D \mid \text{the maximum prime factor of } d \text{ is } p_l, \text{ i.e.,} \tag{3}$$

$r_k$ do not have prime factors larger than $p_l\}$ for $l = 1, 2, \ldots, m$ $$C(p_0) = C(1) = \begin{cases} 1, & \text{if } 1 \in D \\ \emptyset, & \text{if } 1 \notin D \end{cases}$$

For example, suppose D={1,2, . . . ,10}, then P(D)={2, 3,5,7}. Thus:

$$C(p_0) = C(1) = \{1\},$$

$$C(p_1) = C(2) = \{2, 4, 8\} = \{r_k \times 2 | k = 1, 2, 3\} = \{1 \times 2, 2 \times 2, 4 \times 2\},$$

$$C(p_2) = C(3) = \{3, 6, 9\} = \{r_k \times 3 | k = 1, 2, 3\} = \{1 \times 3, 2 \times 3, 3 \times 3\},$$

$$C(p_3) = C(5) = \{5, 10\} = \{r_k \times 5 | k = 1, 2\} = \{1 \times 5, 2 \times 5\},$$

$$C(p_4) = C(7) = \{7\} = \{r_k \times 7 | k = 1\} = \{1 \times 7\}.$$

Based on these clusters, any positive variable defined in D may be reformulated using binary variables $u_i$, i=1,2, . . . ,10:

$$\begin{aligned} x &= u_1 + 2u_2 + 3u_3 + 4u_4 + 5u_5 + 6u_6 + 7u_7 + 8u_8 + 9u_9 + 10u_{10} \\ &= u_1 + (2u_2 + 4u_4 + 8u_8) + (3u_3 + 6u_6 + 9u_9) + (5u_5 + 10u_{10}) + (7u_7) \\ &= u_0 + 2(u_{1,1} + 2u_{1,2} + 4u_{1,3}) + 3(u_{2,1} + 2u_{2,2} + 3u_{2,3}) + \\ &\quad 5(u_{3,1} + 2u_{3,2}) + 7(u_{4,1}) \end{aligned}$$

where $u_0 + u_{1,1} + u_{1,2} + u_{1,3} + u_{2,1} + u_{2,2} + u_{2,3} + u_{3,1} + u_{3,2} + u_{4,1} = 1.$ Thus, a first Proposition is presented below:

Proposition 1. Consider a positive integer variable x∈D={$d_1$, $d_2$, . . . , $d_M$}, P(D)={$p_1$, $p_2$, . . . , $p_m$}, $p_1 < p_2 < \ldots < p_m$ and C($p_l$), l=0,1, . . . , m is defined in (3) above, thus x can be expressed as:

$$\begin{aligned} x &= \sum_{i=1}^{M} d_i u_i = \sum_{l=0}^{m} \sum_{d_j \in C(p_l)} d_j u_j \\ &= I_{\{C(p_0) \neq \emptyset\}} u_0 + \sum_{l=1}^{m} p_l \left(r_{l,1} u_{l,1} + r_{l,2} u_{l,2} + \ldots + r_{l,k_l} u_{l,k_l}\right) \end{aligned} \tag{4}$$

where $I_{\{C(p_0) \neq \emptyset\}} u_0 + \sum_{l=1}^{m} \sum_{k=1}^{k_l} u_{l,k} = 1.$ $u_0, u_{l,k} \in \{0, 1\},$ for $l = 1, 2, \ldots, m, k = 1, 2, \ldots, k_l.$ To study cross terms and not just x, the method starts from a two-variables cross term. Suppose $x_i \in$ D={$d_1$, $d_2$, . . . , $d_M$} and $x_j \in$ E={$e_1$, $e_2$, . . . , $e_T$}. Assume P(D)={$p_1$, $p_2$, . . . , $p_m$}, $p_1 < p_2 < \ldots < \{p_m$ and P(E)=$q_1$, $q_2$, . . . , $q_t\}$, $q_1 < q_2 < \ldots < q_t.$ Denote $C_D(p_l)$ as:

$$C_D(p_l) = \{d = r_k \times p_l \in D \mid \text{the maximum prime factor of } d \text{ is} \tag{5}$$

$p_l, \text{i.e., } r_k \text{ do not have prime factors larger than } p_l\}$ for $l = 1, 2, \ldots, m$ $$C_D(p_0) = C_D(1) = \begin{cases} \{1\}, & \text{if } 1 \in D \\ \emptyset, & \text{if } 1 \notin D \end{cases}$$

Similarly, $$C_E(q_l) = \{d = r_k \times p_l \in E \mid \text{the maximum prime factor of } d \text{ is}$$

$q_l, \text{i.e., } r_k \text{ do not have prime factors larger than } p_l\}$ for $l = 1, 2, \ldots, t$ $$C_E(q_0) = C_E(1) = \begin{cases} \{1\}, & \text{if } 1 \in E \\ \emptyset, & \text{if } 1 \notin E \end{cases}$$

-continued

Denote $T_{i_1 i_2 \dots i_n}(p_{i_1}, p_{i_2}, \dots p_{i_n})$ as a set specified as:

$$T_{i_1 i_2 \dots i_n}(p_{i_1}, p_{i_2}, \dots p_{i_n}) = \{x_i x_j \mid x_i \in C_D(p_i) \text{ and } x_j \in C_E(p_j)\}$$

Denote $\overline{T}_{i_1 i_2 \dots i_n}(p_i)$ as a set specified as: $\quad$ (6)

$$\overline{T}_{i_1 i_2 \dots i_n}(p_i) = \left( \bigcup_{p_{i_1} \leq p_i} T_{i_1 T_{i_2} \dots i_n}(p_{i_1}, p_{i_2}, \dots p_{i_n}) \right) \cup$$

$$\left( \bigcup_{p_{i_2} \leq p_i} T_{i_1 T_{i_2} \dots i_n}(p_{i_1}, p_{i_2}, \dots p_{i_n}) \right) \cup$$

$$\dots \cup \left( \bigcup_{p_{i_n} \leq p_i} T_{i_1 i_2 \dots i_n}(p_{i_1}, p_{i_2}, \dots p_i) \right)$$

Proposition 2: A function $F_{ij}(x_i, x_j)=x_i x_j$, where $x_i$ and $x_j$ specified in (4), $\overline{T}_{ij}(p_i)$ is defined as (6) where $p_i \in P(D)$ and $P(D)$ is defined in (2), can be expressed linearly as:

$$x_i x_j = \left( u_{i,1} + \sum_{l=1} l u_{il} \right) \left( u_{j,1} + \sum_{l=1} l u_{jl} \right) \quad (7)$$

$$= y_{ij,1} + \sum_{t \in \overline{T}_{ij}(2)} t y_{ij,t} + \sum_{t \in \overline{T}_{ij}(3)} t y_{ij,t} + \dots + \sum_{t \in \overline{T}_{ij}(p_{m'})} t y_{ij,t}$$

where $y_{ij,1} + \sum_{t \in \overline{T}_{ij}(2)} y_{ij,t} + \sum_{t \in \overline{T}_{ij}(3)} y_{ij,t} + \dots + \sum_{t \in \overline{T}_{ij}(p_{m'})} y_{ij,t} = 1,$ $$y_{ij,t} \in \{0, 1\}$$

Denote P-Map($x_i \times x_j$, m) a prime-scheme-map of $x_i \times x_j$, which illustrates $x_i x_j$ products and associated locations on a two dimensional map, where $x_i$ and $x_j$ are integers between 1 and m, specified as:

$$P\text{-Map}(x_i \times x_j, m) = \quad (8)$$

$$\{(t, q, q') \mid t = T_{ij}(1, 1) \cup T_{ij}(1, 2) \cup \dots \cup T_{ij}(p_{m'}, p_{m'}), q \leq q',$$
$$t = q \times q', q \in x_i \text{ and } q' \in x_j\}$$

Proposition 3: For $t = q \times q'$, $q \in C(p_i)$ and $q' \in C(p_j)$, it is true that $$y_{ij,t} \geq u_{i,q} + u_{j,q'} - 1 \text{ and } y_{ij,t} \geq u_{i,q'} + u_{j,q} - 1 \quad (9)$$

A main result is then determined as shown below.

Theorem 1. Consider a product function $F_{ij}(x_1, x_2) = x_1 x_2$, where $x_i$ for i=1,2 are expressed in $T_{ij}(p_i)$ is defined as (6) where $p_i \in P(D)$ and $P(D)$ is defined in (2), and:

$$x_i = \sum_{\delta=1}^{m} \delta u_{i,\delta}, \sum_{\delta=1}^{m} u_{i,\delta} = 1, \text{ for } i = 1, 2 \quad (10)$$

$$F_{ij}(x_1, x_2) \text{ can be expressed linearly as:} \quad (11)$$

$$F_{ij}(x_1, x_2) = y_{ij,1} + \sum_{t \in \overline{T}_{ij}(2)} t y_{ij,t} + \sum_{t \in \overline{T}_{ij}(3)} t y_{ij,t} + \dots + \sum_{t \in \overline{T}_{ij}(p_{m'})} t y_{ij,t}$$

where: $\quad (12)$ (i) $\sum_{t \in \overline{T}_{ij}(1,1)} y_{ij,t} + \sum_{t \in \overline{T}_{ij}(1,2)} y_{ij,t} +$ $$\sum_{t \in \overline{T}_{ij}(1,3)} y_{ij,t} + \dots + \sum_{t \in \overline{T}_{ij}(p_{m'}, p_{m'})} y_{ij,t} = 1$$

(ii) $\left. \begin{array}{l} y_{12,t} \geq u_{1,k} + u_{2,l} - 1 \\ y_{12,t} \geq u_{1,l} + u_{2,k} - 1 \end{array} \right\} \quad (13)$ -continued (iii) $u_{i,k} \in 0, 1$, and $y_{1,2,t} \geq 0$.

(iv) There is no overlapping value between $\overline{T}_{ij}(p_i)$ and $\overline{T}_{ij}(p_j)$ for $p_i \neq p_j$.

Table 2 is a prime scheme map of P-Map($x_1 \times x_2$, m=10). The merits of these prime scheme maps are that we can use fewer variables and more precise constraints, as compared to existing solutions, to linearize a product term $x_i x_j$. Moreover, it can be extended to treat high order functions such as $x_1 x_2 x_3 x_4$, $x_1 x_2 x_3 x_4$ and $x_1 x_2 x_3 x_4 x_5$ as shown just prior to "Proposition 4."

TABLE 2

| | | | | | $r_k$ | | | | | |
|---|---|---|---|---|---|---|---|---|---|---|
| | 1 | 1 | 2 | 4 | 1 | 2 | 3 | 1 | 2 | 1 |
| | | | | | $x_2$ | | | | | |
| $x_1$ | 1 | 2 | 4 | 8 | 3 | 6 | 9 | 5 | 10 | 7 |
| 1 | 1 | 2 | 4 | 8 | 3 | 6 | 9 | 5 | 10 | 7 |
| 2 | 2 | 4 | 8 | 16 | 6 | 12 | 18 | 10 | 20 | 14 |
| 4 | 4 | | 32 | | | 24 | 36 | | 40 | 28 |
| 8 | 8 | | 64 | | | 48 | 72 | | 80 | 56 |
| 3 | 3 | 6 | | | 9 | 18 | 27 | 15 | 30 | 21 |
| 6 | 6 | 12 | 24 | 48 | | 36 | 54 | | 60 | 42 |
| 9 | 9 | 18 | 36 | 72 | | | 81 | 45 | 90 | 63 |
| 5 | 5 | 10 | | | | 15 | | 45 | 50 | 35 |
| 10 | 10 | 20 | 40 | 80 | 30 | 60 | 90 | | 100 | 70 |
| 7 | 7 | 14 | 28 | 56 | 21 | 42 | 63 | 35 | 70 | 49 |

Refering to expressions (5) and (6), Table 3 can be formed, where:

$$\overline{T}_{12}(1) = T_{12}(1, 1)$$

$$\overline{T}_{12}(2) = T_{12}(1, 2) \cup T_{12}(2, 1) \cup T_{12}(2, 2)$$

$$\overline{T}_{12}(3) = T_{12}(1, 3) \cup T_{12}(3, 1) \cup T_{12}(2, 3) \cup T_{12}(3, 2) \cup T_{12}(3, 3)$$

$$\overline{T}_{12}(5) = T_{12}(1, 5) \cup T_{12}(5, 1) \cup$$

$$T_{12}(2, 5) \cup T_{12}(5, 2) \cup T_{12}(3, 5) \cup T_{12}(5, 3) \cup T_{12}(5, 5)$$

$$\overline{T}_{12}(7) = T_{12}(1, 7) \cup T_{12}(7, 1) \cup T_{12}(2, 7) \cup T_{12}(7, 2) \cup$$

$$T_{12}(3, 7) \cup T_{12}(7, 3) \cup T_{12}(5, 7) \cup T_{12}(7, 5) \cup T_{12}(7, 7)$$

Based on the prime number theorem, one can see there are fewer overlapping values between any two sets in $\overline{T}_{12}(2)$, $\overline{T}_{12}(3)$, $\overline{T}_{12}(5)$, and $\overline{T}_{12}(7)$. Table 2, for instance, the value 12 (comes from 3×4 and 4×3), which only appears in $\overline{T}_{12}(3)$ and does not appear in $\overline{T}_{12}(2)$, $\overline{T}_{12}(5)$, or $T_{12}(7)$. This is a valuable feature of the PARA235 method. Compared with current other methods for solving EDOPs using parallel computing, this feature helps to significantly reduce the number of variables and constraints in solving EDOPs.

TABLE 3

| | | | | $x_2$ | | | | | |
|---|---|---|---|---|---|---|---|---|---|
| $x_1$ | 1 | 2 | 4 | 8 | 3 | 6 | 9 | 5 | 10 | 7 |
| 1 | $T_{12}(1, 1)$ | $T_{12}(1, 2)$ | | | $T_{12}(1, 3)$ | | | $T_{12}(1, 5)$ | | $T_{12}(1, 7)$ |
| 2 | $T_{12}(2, 1)$ | $T_{12}(2, 2)$ | | | $T_{12}(2, 3)$ | | | $T_{12}(2, 5)$ | | $T_{12}(2, 7)$ |
| 4 | | | | | | | | | | |
| 8 | | | | | | | | | | |

11

TABLE 3-continued

| $x_1$ | 1 | 2 | 4 | 8 | 3 | 6 | 9 | 5 | 10 | 7 |
|---|---|---|---|---|---|---|---|---|---|---|
| 3 | $T_{12}(3, 1)$ | $T_{12}(3, 2)$ | | | $T_{12}(3, 2)$ | | | $T_{12}(3, 5)$ | | $T_{12}(3, 7)$ |
| 6 | | | | | | | | | | |
| 9 | | | | | | | | | | |
| 5 | $T_{12}(5, 1)$ | $T_{12}(5, 2)$ | | | $T_{12}(5, 3)$ | | | $T_{12}(5, 5)$ | | $T_{12}(5, 7)$ |
| 10 | | | | | | | | | | |
| 7 | $T_{12}(7, 1)$ | $T_{12}(7, 2)$ | | | $T_{12}(7, 3)$ | | | $T_{12}(7, 5)$ | | $T_{12}(7, 7)$ |

Following Theorem 1, $x_1 x_2$ can be expressed linearly as:

$$x_1 x_2 = 1y_{12,1} + 2y_{12,2} + 3y_{12,3} + 5y_{12,5} +$$
$$7y_{12,7} + (4y_{12,4} + 8y_{12,8} + 16y_{12,16} + 32y_{12,32} + 64y_{12,64}) +$$
$$(6y_{12,6} + 12y_{12,12} + 18y_{12,18} + 24y_{12,24} + 36y_{12,36} + 48y_{12,48} + 72y_{12,72}) +$$
$$(10y_{12,10} + 20y_{12,20} + 40y_{12,40} + 80y_{12,80}) + (14y_{12,14} + 28y_{12,28} + 56y_{12,56}) +$$
$$(9y_{12,9} + 18y_{12,28} + 27y_{12,27} + 36y_{12,36} + 54y_{12,54} + 81y_{12,81}) +$$
$$(15y_{12,15} + 30y_{12,30} + 60y_{12,60} + 45y_{12,45} + 90y_{12,90}) +$$
$$(21y_{12,21} + 42y_{12,42} + 63y_{12,63}) +$$
$$(25y_{12,25} + 50y_{12,50} + 100y_{12,100}) + (35y_{12,35} + 70y_{12,70}) + (49y_{12,49})$$

Subjected to following constraints:

$$\left. \begin{aligned} x_i &= u_{i1} + 2u_{i2} + 4u_{i4} + 8u_{i8} + 3u_{i3} + 6u_{i6} + 9u_{i9} + 5u_{i5} + 10u_{i10} + 7u_{i7} \\ u_{i1} &+ u_{i2} + u_{i4} + u_{i8} + u_{i3} + u_{i6} + u_{i9} + 5u_{i5} + 10u_{i10} + 7u_{i7} = 1 \end{aligned} \right\} \text{ for}$$

$$i = 1, 2$$

$$y_{12,1} \geq u_{1,1} + u_{2,1} - 1$$

for $\overline{T}_{12}(2)$:

$$\begin{cases} y_{12,2} \geq u_{1,1} + u_{2,2} - 1, & y_{12,2} \geq u_{1,2} + u_{2,1} - 1, \\ y_{12,4} \geq u_{1,1} + u_{2,4} - 1, & y_{12,4} \geq u_{1,4} + u_{2,1} - 1, \\ y_{12,8} \geq u_{1,1} + u_{2,8} - 1, & y_{12,8} \geq u_{1,8} + u_{2,1} - 1, \\ y_{12,8} \geq u_{1,2} + u_{2,4} - 1, & y_{12,8} \geq u_{1,4} + u_{2,2} - 1, \\ y_{12,16} \geq u_{1,2} + u_{2,8} - 1, & y_{12,16} \geq u_{1,8} + u_{2,2} - 1, \quad y_{12,16} \geq u_{1,4} + u_{2,4} - 1, \\ y_{12,32} \geq u_{1,4} + u_{2,8} - 1, & y_{12,32} \geq u_{1,8} + u_{2,4} - 1, \\ y_{12,64} \geq u_{1,8} + u_{2,8} - 1, \end{cases}$$

for $\overline{T}_{12}(3)$:

$$\begin{cases} y_{12,3} \geq u_{1,1} + u_{2,3} - 1, & y_{12,3} \geq u_{1,3} + u_{2,1} - 1, \\ y_{12,6} \geq u_{1,2} + u_{2,3} - 1, & y_{12,6} \geq u_{1,3} + u_{2,2} - 1, \\ y_{12,9} \geq u_{1,3} + u_{2,3} - 1, & y_{12,9} \geq u_{1,3} + u_{2,3} - 1, \\ y_{12,12} \geq u_{1,3} + u_{2,4} - 1, & y_{12,12} \geq u_{1,4} + u_{2,3} - 1, \\ y_{12,12} \geq u_{1,3} + u_{2,6} - 1, & y_{12,12} \geq u_{1,6} + u_{2,2} - 1, \\ y_{12,18} \geq u_{1,2} + u_{2,9} - 1, & y_{12,18} \geq u_{1,9} + u_{2,2} - 1, \\ y_{12,18} \geq u_{1,3} + u_{2,6} - 1, & y_{12,18} \geq u_{1,6} + u_{2,3} - 1, \\ y_{12,24} \geq u_{1,3} + u_{2,8} - 1, & y_{12,24} \geq u_{1,8} + u_{2,3} - 1, \\ y_{12,24} \geq u_{1,4} + u_{2,6} - 1, & y_{12,24} \geq u_{1,6} + u_{2,4} - 1, \\ y_{12,27} \geq u_{1,3} + u_{2,9} - 1, & y_{12,27} \geq u_{1,9} + u_{2,3} - 1, \\ y_{12,36} \geq u_{1,4} + u_{2,9} - 1, & y_{12,36} \geq u_{1,9} + u_{2,4} - 1, \quad y_{12,36} \geq u_{1,6} + u_{2,6} - 1, \\ y_{12,48} \geq u_{1,6} + u_{2,8} - 1, & y_{12,48} \geq u_{1,8} + u_{2,6} - 1, \\ y_{12,54} \geq u_{1,6} + u_{2,9} - 1, & y_{12,54} \geq u_{1,9} + u_{2,6} - 1, \\ y_{12,72} \geq u_{1,8} + u_{2,9} - 1, & y_{12,72} \geq u_{1,9} + u_{2,8} - 1, \\ y_{12,81} \geq u_{1,9} + u_{3,9} - 1, \end{cases}$$

12

-continued for $\overline{T}_{12}(5)$:

$$\begin{cases} y_{12,5} \geq u_{1,1} + u_{2,5} - 1, & y_{12,5} \geq u_{1,5} + u_{2,1} - 1, \\ y_{12,10} \geq u_{1,1} + u_{2,10} - 1, & y_{12,10} \geq u_{1,10} + u_{2,1} - 1, \\ y_{12,10} \geq u_{1,2} + u_{2,5} - 1, & y_{12,10} \geq u_{1,5} + u_{2,2} - 1, \\ y_{12,15} \geq u_{1,3} + u_{2,5} - 1, & y_{12,15} \geq u_{1,5} + u_{2,3} - 1, \\ y_{12,20} \geq u_{1,4} + u_{2,5} - 1, & y_{12,20} \geq u_{1,5} + u_{2,5} - 1, \\ y_{12,20} \geq u_{1,2} + u_{2,10} - 1, & y_{12,20} \geq u_{1,10} + u_{2,2} - 1, \\ y_{12,25} \geq u_{1,5} + u_{2,5} - 1 \\ y_{12,30} \geq u_{1,5} + u_{2,6} - 1, & y_{12,30} \geq u_{1,6} + u_{2,5} - 1, \\ y_{12,30} \geq u_{1,5} + u_{2,6} - 1, & y_{12,30} \geq u_{1,6} + u_{2,5} - 1, \\ y_{12,30} \geq u_{1,10} + u_{2,3} - 1, & y_{12,30} \geq u_{1,3} + u_{2,10} - 1, \\ y_{12,35} \geq u_{1,5} + u_{2,7} - 1, & y_{12,30} \geq u_{1,6} + u_{2,5} - 1, \\ y_{12,40} \geq u_{1,5} + u_{2,8} - 1, & y_{12,40} \geq u_{1,8} + u_{2,5} - 1, \\ y_{12,40} \geq u_{1,10} + u_{2,4} - 1, & y_{12,40} \geq u_{1,4} + u_{2,10} - 1, \\ y_{12,45} \geq u_{1,5} + u_{2,9} - 1, & y_{12,45} \geq u_{1,9} + u_{2,5} - 1, \\ y_{12,50} \geq u_{1,5} + u_{2,10} - 1, & y_{12,50} \geq u_{1,10} + u_{2,5} - 1, \\ y_{12,60} \geq u_{1,6} + u_{2,10} - 1, & y_{12,60} \geq u_{1,10} + u_{2,6} - 1, \\ y_{12,70} \geq u_{1,7} + u_{2,10} - 1, & y_{12,70} \geq u_{1,10} + u_{2,7} - 1, \\ y_{12,80} \geq u_{1,8} + u_{2,10} - 1, & y_{12,80} \geq u_{1,10} + u_{2,8} - 1, \\ y_{12,90} \geq u_{1,9} + u_{2,10} - 1, & y_{12,90} \geq u_{1,10} + u_{2,9} - 1, \\ y_{12,100} \geq u_{1,10} + u_{2,10} - 1, \end{cases}$$

for $\overline{T}_{12}(7)$:

$$\begin{cases} y_{12,7} \geq u_{1,1} + u_{2,7} - 1, & y_{12,7} \geq u_{1,7} + u_{2,1} - 1, \\ y_{12,14} \geq u_{1,2} + u_{2,7} - 1, & y_{12,14} \geq u_{1,7} + u_{2,2} - 1, \\ y_{12,21} \geq u_{1,3} + u_{2,7} - 1, & y_{12,21} \geq u_{1,7} + u_{2,3} - 1, \\ y_{12,28} \geq u_{1,4} + u_{2,7} - 1, & y_{12,28} \geq u_{1,7} + u_{2,4} - 1, \\ y_{12,35} \geq u_{1,5} + u_{2,7} - 1, & y_{12,36} \geq u_{1,7} + u_{2,5} - 1, \\ y_{12,42} \geq u_{1,6} + u_{2,7} - 1, & y_{12,42} \geq u_{1,7} + u_{2,6} - 1, \\ y_{12,49} \geq u_{1,7} + u_{2,7} - 1, \\ y_{12,56} \geq u_{1,7} + u_{2,8} - 1, & y_{12,56} \geq u_{1,8} + u_{2,7} - 1, \\ y_{12,63} \geq u_{1,7} + u_{2,9} - 1, & y_{12,63} \geq u_{1,9} + u_{2,7} - 1, \\ y_{12,70} \geq u_{1,7} + u_{2,10} - 1, & y_{12,70} \geq u_{1,10} + u_{2,7} - 1, \end{cases}$$

$$y_{12,1} + (y_{12,2} + y_{12,4} + y_{12,8} + y_{12,16} + y_{12,32} + y_{12,64} + \ldots + y_{12,7} + y_{12,14}) +$$
$$(y_{12,21} + y_{12,28} + y_{12,35} + y_{12,42} + y_{12,49} + y_{12,56} + y_{12,63} + y_{12,70}) = 1,$$
$$\text{where } y_{12,t} \geq 0, \, u_{1,1}, u_{1,2}, \ldots u_{1,7}, u_{2,1}, u_{2,2}, \ldots, u_{2,7} \in \{0, 1\}.$$

In another aspects, the invention includes, for example, a treatment for higher-order products. Based on the above discussion, EDOP functions can be linearized with the higher-order product. Consider the following notation for three variables, in one example:

$$T_{\rho_i^\alpha \rho_j^\beta \rho_k^\gamma}(\rho_i, \rho_j, \rho_k) = \{x_i^\alpha x_j^\beta x_k^\gamma | \alpha, \beta, \gamma \text{ are non-negative integers,}$$
$$x_i \in C(\rho_i), x_j \in C(\rho_j), x_k \in C(\rho_k)\}$$

where $C(\rho_i)$ and $x_i$ are specified in (3) and (4), respectively. This leads to the following proposition:

Proposition 4: A function $F_{123}(x_1, x_2, x_3) = x_1 x_2 x_3$, where $x_1, x_2, x_3$ are specified in (1), $T_{123}(p_1, p_2, p_3)$ is defined as (5) where $p_i \in P(D)$ and $P(D)$ is defined in (2), can be linearized as:

$$F_{123}(x_1, x_2, x_3) = \sum_{(p_1, p_2, p_3)} \sum_{t \in T_{123}(p_1, p_2, p_3)} ty_{123,t} \qquad (1)$$

where $y_{123,t}$ are restricted by following constraints:

$$\sum_{(p_1, p_2, p_3)} \sum_{t \in T_{123}(p_1, p_2, p_3)} y_{123,t} = 1$$

Example 1. Consider a function $F(x_1, x_2, x_3) = x_1 x_2 x_3$, $1 \leq x_i > 10$, for $i = 1, 2, 3$. $T_{123}(p_1, p_2, p_3)$ is defined as (5) where $p_i \in P(D)$ and $P(D)$ is defined in (2). From Proposition 4, it is desired to know $$F(x_1, x_2, x_3) = \sum_{(p_1, p_2, p_3)} \sum_{t \in T_{123}(p_1, p_2, p_3)} ty_{123, t}$$

where:

(i) encompasses the cases where one of the x_i takes value 1 (which is in the domain but not a prime number);

(ii) encompasses the cases where one of the x_i takes value 2;

(iii) encompasses the cases where one of the x_i takes value 3;

(iv) encompasses the cases where one of the x_i takes value 5;

(v) encompasses the case where one of the x_i takes value 7.

(i) Start:

$$T_{123}(1, 1, 1) = T_{12}(1, 1) \times \{1\} = \{1\} \times \{1\} = \{1\}$$

$$T_{123}(1, 1, 2) = T_{123}(1, 2, 1) = T_{123}(1, 1, 1) = T_{12}(1, 1) \times C_{10}(2) = \{1\} \times \{2\ 4\ 8\}$$
$$= \{2\ 4\ 8\}$$

$$T_{123}(1, 1, 3) = T_{123}(1, 3, 1) = T_{123}(3, 1, 1) = T_{12}(1, 1) \times C_{10}(3) = \{1\} \times \{3\ 6\ 9\}$$
$$= \{3\ 6\ 9\}$$

$$T_{123}(1, 1, 5) = T_{123}(1, 5, 1) = T_{123}(1, 5, 1) = T_{12}(1, 1) \times C_{10}(5) = \{1\} \times \{5\ 10\}$$
$$= \{5\ 10\}$$

$$T_{123}(1, 1, 7) = T_{123}(1, 7, 1) = T_{123}(7, 1, 1) = T_{12}(1, 1) \times C_{10}(7) = \{1\} \times \{7\}$$
$$= \{7\}$$

$$T_{123}(1, 2, 2) = T_{123}(2, 1, 2) = T_{123}(2, 2, 1) = T_{12}(1, 2) \times C_{10}(2)$$
$$= \{2\ 4\ 8\} \times \{2\ 4\ 8\} = \{4\ 8\ 16\ 32\ 64\}$$

$$T_{123}(1, 2, 3) = T_{123}(1, 3, 2) = T_{123}(2, 1, 3) = T_{123}(2, 3, 1) = T_{123}(3, 1, 2) = T_{123}(3, 2, 1)$$
$$= T_{12}(1, 2) \times C_{10}(3) = \{2\ 4\ 8\} \times \{3\ 6\ 9\}$$
$$= \{6\ 12\ 18\ 24\ 36\ 48\ 72\}$$

$$T_{123}(1, 2, 5) = T_{123}(1, 5, 2) = T_{123}(2, 1, 5) = T_{123}(2, 5, 1) = T_{123}(5, 1, 2) = T_{123}(5, 2, 1)$$
$$= T_{12}(1, 2) \times C_{10}(5) = \{2\ 4\ 8\} \times \{5\ 10\} = \{10\ 20\ 40\ 80\}$$

$$T_{123}(1, 2, 7) = T_{123}(1, 7, 2) = T_{123}(2, 1, 7) = T_{123}(2, 7, 1) = T_{123}(7, 1, 2) = T_{123}(7, 2, 1)$$
$$= T_{12}(1, 2) \times C_{10}(7) = \{2\ 4\ 8\} \times \{7\} = \{14\ 28\ 56\}$$

$$T_{123}(1, 3, 3) = T_{123}(3, 1, 3) = T_{123}(3, 3, 1) = T_{12}(1, 3) \times C_{10}(3)$$
$$= \{3\ 6\ 9\} \times \{3\ 6\ 9\} = \{9\ 18\ 27\ 36\ 54\ 81\}$$

$$T_{123}(1, 3, 5) = T_{123}(1, 5, 3) = T_{123}(3, 1, 5) = T_{123}(3, 5, 1) = T_{123}(5, 1, 3) = T_{123}(5, 3, 1)$$
$$= T_{12}(1, 3) \times C_{10}(5) = \{3\ 6\ 9\} \times \{5\ 10\} = \{15\ 30\ 60\ 45\ 90\}$$

$$T_{123}(1, 3, 7) = T_{123}(1, 3, 7) = T_{123}(1, 3, 7) = T_{123}(1, 3, 7) = T_{123}(1, 3, 7) = T_{123}(1, 3, 7)$$
$$= T_{12}(1, 3) \times C_{10}(7) = \{3\ 6\ 9\} \times \{7\} = \{21\ 42\ 63\}$$

$$T_{123}(1, 5, 5) = T_{123}(5, 1, 5) = T_{123}(5, 5, 1) = T_{12}(1, 5) \times C_{10}(5)$$
$$= \{5\ 10\} \times \{5\ 10\} = \{25\ 50\ 100\}$$

$$T_{123}(1, 5, 7) = T_{123}(1, 7, 5) = T_{123}(5, 1, 7) = T_{123}(5, 7, 1) = T_{123}(7, 1, 5) = T_{123}(7, 5, 1)$$
$$= T_{12}(1, 5) \times C_{10}(7) = \{5\ 10\} \times \{7\} = \{35\ 70\}$$

$$T_{123}(1, 7, 7) = T_{123}(7, 1, 7) = T_{123}(7, 7, 1) = T_{12}(1, 1) \times C_{10}(7) = \{(7) \times (7)\}$$
$$= \{49\}$$

(i) End.

(ii) Start:

$$T_{123}(2, 2, 2) = T_{12}(2, 2) \times C_{10}(2) = \{4\ 8\ 16\ 32\ 64\} \times \{2\ 4\ 8\}$$
$$= \{8\ 16\ 32\ 64\ 128\ 256\ 512\}$$

$$T_{123}(2, 2, 3) = T_{123}(2, 3, 2) = T_{123}(3, 3, 2) = T_{12}(2, 2) \times C_{10}(3)$$
$$= \{4\ 8\ 16\ 32\ 64\} \times \{3\ 6\ 9\}$$
$$= \{12\ 24\ 36\ 48\ 72\ 96\ 144\ 192\ 288\ 384\ 576\}$$

$$T_{123}(2, 2, 5) = T_{123}(2, 5, 2) = T_{123}(5, 2, 2) = T_{12}(2, 2) \times C_{10}(5)$$
$$= \{4\ 8\ 16\ 32\ 64\} \times \{5\ 10\} = \{20\ 40\ 80\ 160\ 320\ 640\}$$

$$T_{123}(2, 2, 7) = T_{123}(2, 7, 2) = T_{123}(7, 2, 2) = T_{12}(2, 2) \times C_{10}(7)$$
$$= \{4\ 8\ 16\ 32\ 64\} \times \{7\} = \{28\ 56\ 112\ 224\ 448\}$$

$$T_{123}(2, 3, 3) = T_{123}(3, 2, 3) = T_{123}(3, 3, 2) = T_{12}(3, 3) \times C_{10}(3)$$
$$= \{6\ 12\ 18\ 24\ 36\ 48\ 72\} \times \{3\ 6\ 9\}$$
$$= \{18\ 36\ 54\ 72\ 108\ 162\ 144\ 216\ 324\ 288\ 432\ 648\}$$

-continued $T_{123}(2, 3, 5) = T_{123}(2, 5, 3) = T_{123}(3, 2, 5) = T_{123}(3, 5, 2) = T_{123}(5, 2, 3) = T_{123}(5, 3, 2)$
$= T_{12}(2, 3) \times C_{10}(5) = \{6\ 12\ 18\ 24\ 36\ 48\ 72\} \times \{5\ 10\}$
$= \{30\ 60\ 120\ 90\ 180\ 240\ 360\ 480\ 720\}$ $T_{123}(2, 3, 7) = T_{123}(2, 7, 3) = T_{123}(3, 2, 7) = T_{123}(3, 7, 2) = T_{123}(7, 2, 3) = T_{123}(7, 3, 2)$
$= T_{12}(2, 3) \times C_{10}(7) = \{6\ 12\ 18\ 24\ 36\ 48\ 72\} \times \{7\}$
$= \{42\ 84\ 126\ 168\ 252\ 336\ 504\}$ $T_{123}(2, 5, 5) = T_{123}(5, 2, 5) = T_{123}(5, 5, 2) = T_{12}(2, 5) \times C_{10}(5)$
$= \{10\ 20\ 40\ 80\} \times \{5\ 10\} = \{50\ 100\ 200\ 400\ 800\}$ $T_{123}(2, 5, 7) = T_{123}(2, 7, 5) = T_{123}(5, 2, 7) = T_{123}(5, 7, 2) = T_{123}(7, 2, 5) = T_{123}(7, 5, 2)$
$= T_{12}(2, 5) \times C_{10}(7) = \{10\ 20\ 40\ 80\} \times \{7\} = \{70\ 140\ 280\ 560\}$ $T_{123}(2, 7, 7) = T_{123}(7, 2, 7) = T_{123}(7, 7, 2) = T_{12}(2, 7) \times C_{10}(7)$
$= \{4\ 8\ 16\ 32\ 64\} \times \{7\} = \{28\ 56\ 112\ 224\ 448\}$ (ii) End.
(iii) Start:

$T_{123}(3, 3, 3) = T_{12}(3, 3) \times C_{10}(3) = \{9\ 18\ 27\ 36\ 54\ 81\} \times \{3\ 6\ 9\}$
$= \{27\ 54\ 81\ 108\ 162\ 243\ 216\ 324\ 486\ 729\}$ $T_{123}(3, 3, 5) = T_{123}(3, 5, 3) = T_{123}(5, 3, 3) = T_{12}(3, 3) \times C_{10}(5)$
$= \{9\ 18\ 27\ 36\ 54\ 81\} \times \{5\ 10\} = \{45\ 90\ 180\ 135\ 270\ 360\ 540\ 405\ 810\}$ $T_{123}(3, 3, 7) = T_{123}(3, 7, 3) = T_{123}(7, 3, 3) = T_{12}(3, 3) \times C_{10}(7)$
$= \{9\ 18\ 27\ 36\ 54\ 81\} \times \{7\} = \{63\ 126\ 189\ 252\ 378\ 567\}$ $T_{123}(3, 5, 5) = T_{123}(5, 3, 5) = T_{123}(5, 5, 3) T_{12}(3, 5) \times C_{10}(5)$
$= \{15\ 30\ 60\ 45\ 90\} \times \{5\ 10\} = \{75\ 150\ 300\ 600\ 225\ 450\ 900\}$ $T_{123}(3, 5, 7) = T_{123}(3, 7, 5) = T_{123}(5, 3, 7) = T_{123}(5, 7, 3) = T_{123}(7, 3, 5) = T_{123}(7, 5, 3)$
$= T_{12}(3, 5) \times C_{10}(7) = \{15\ 30\ 60\ 45\ 90\} \times \{7\} = \{105\ 210\ 420\ 315\ 630\}$ $T_{123}(3, 7, 7) = T_{123}(7, 3, 7) = T_{123}(7, 7, 3) = T_{12}(3, 7) \times C_{10}(75)$
$= \{21\ 42\ 63\} \times 7 = \{147\ 294\ 441\}$ (iii) End.
(iv) Start:

$T_{123}(5, 5, 5) = T_{12}(5, 5) \times C_{10}(5) = \{25\ 50\ 100\} \times \{5\ 10\} = \{125\ 250\ 500\ 1000\}$ $T_{123}(5, 5, 7) = T_{123}(5, 7, 5) = T_{123}(7, 5, 5) = T_{12}(5, 5) \times C_{10}(7) = \{25\ 50\ 100\} \times \{7\}$
$= \{175\ 350\ 700\}$ $T_{123}(5, 7, 7) = T_{123}(7, 5, 7) = T_{123}(7, 7, 5) = T_{12}(5, 7) \times C_{10}(7) = \{35\ 70\} \times \{7\}$
$= \{245\ 490\}$ $T_{123}(7, 7, 7) = T_{12}(7, 7) \times C_{10}(7) = \{49\} \times \{7\} = \{343\}$ (iv) End.

The P-Map for $T_{123}(p_{l_1}, p_{l_2}, p_{l_3})$ is shown in Table 4 below shows a prime-scheme-map P-map $(x_1, x_2 \times x_3, m=10)$, where all product values are put on 125 clusters $T_{123}(1,1,1)$, $T_{123}(1,1,2)$, . . . , and $T_{123}(7,7,7)$ are independent of each other.

TABLE 4

| | $x_3$ | | | | | | | | | |
|---|---|---|---|---|---|---|---|---|---|---|
| | 1 | 2 | 4 | 8 | 3 | 6 | 9 | 5 | 10 | 7 |
| $x_1$ | | | | | $x_2$ | | | | | |
| 1 | 1 | 2 | 4 | 8 | 3 | 6 | 9 | 5 | 10 | 7 |
| 2 | 2 | 4 | 8 | 16 | 6 | 12 | 18 | 10 | 20 | 14 |
| 4 | 4 | | | 32 | | 24 | 36 | | 40 | 28 |
| 8 | 8 | | | 64 | | 48 | 72 | | 80 | 56 |
| 3 | 3 | 6 | 12 | 24 | 9 | 18 | 27 | 15 | 30 | 21 |
| 6 | 6 | | | 48 | | 36 | 54 | | 60 | 42 |

TABLE 4-continued

| | $x_3$ | | | | | | | | | |
|---|---|---|---|---|---|---|---|---|---|---|
| | 1 | 2 | 4 | 8 | 3 | 6 | 9 | 5 | 10 | 7 |
| $x_1$ | | | | | $x_2$ | | | | | |
| 9 | 9 | 18 | 36 | 72 | | | 81 | 45 | 90 | 63 |
| 5 | 15 | 10 | 20 | 40 | 15 | 30 | 45 | | 50 | 35 |
| 10 | 10 | | | 80 | | 60 | 90 | | 100 | 70 |
| 7 | 7 | 14 | 28 | 56 | 21 | 42 | 63 | 35 | 70 | 49 |
| . . . | . . . | | . . . | | | . . . | | . . . | | . . . |
| 9 | 9 | 18 | 36 | 72 | 27 | 54 | 81 | 45 | 90 | 63 |
| 18 | 18 | | | 144 | | 108 | 162 | | 180 | 126 |
| 27 | 27 | 54 | 108 | 216 | | | 243 | 135 | 270 | 189 |
| 36 | 36 | | | 288 | 108 | 216 | 324 | | 360 | 252 |
| 54 | 54 | | | 432 | | | 486 | | 540 | 378 |
| 81 | 81 | 162 | 324 | 648 | | | 729 | 405 | 810 | 567 |
| . . . | . . . | | . . . | | | . . . | | . . . | | . . . |
| 7 | 7 | 14 | 28 | 56 | 21 | 42 | 63 | 35 | 70 | 49 |
| 14 | 14 | 28 | 56 | 112 | 42 | 84 | 126 | 70 | 140 | 98 |

TABLE 4-continued

| | | | | $x_3$ | | | | | | |
|---|---|---|---|---|---|---|---|---|---|---|
| | 1 | 2 | 4 | 8 | 3 | 6 | 9 | 5 | 10 | 7 |
| $x_1$ | | | | | $x_2$ | | | | | |
| 28 | 28 | | | 224 | | 168 | 252 | | 280 | 196 |
| 56 | 56 | | | 448 | | 336 | 506 | | 560 | 392 |
| 21 | 21 | 42 | 84 | 168 | 63 | 126 | 189 | 105 | 210 | 147 |
| 42 | 42 | | | 336 | | 252 | 378 | | 420 | 294 |
| 63 | 63 | 126 | 252 | 504 | | | 567 | 315 | 630 | 441 |
| 35 | 35 | 70 | 140 | 280 | 105 | 210 | 315 | 175 | 350 | 245 |
| 70 | 70 | | | 560 | | 420 | 630 | | 700 | 490 |
| 49 | 49 | 98 | 196 | 392 | 147 | 294 | 441 | 245 | 490 | 343 |

Proposition 5. A function $F_{1234}(x_1, x_2, x_3, x_4)=x_1x_2x_3x_4$, where $x_1,x_2,x_3,x_4\in\{1,2,\ldots,m\}$, and $T_{1234}(p_1, p_2, p_3, p_4)$ is defined as (5) where $p_i\in P(D)$ and $P(D)$ is defined in (2), can be linearized as:

$$F_{1234}(x_1, x_2, x_3, x_4) = \sum_{(p_1,p_2,p_3,p_4)}\ \sum_{t\in T_{1234}(p_1,p_2,p_3,p_4)}\ ty_{1234,t} \qquad (15)$$

where $y_{1234,t}$ are restricted by following constraints:

$$\sum_{\left(p_{l_1},p_{l_2},p_{l_3},p_{l_4}\right)}\sum_{t\in T_{1234}\left(p_{l_1},p_{l_2},p_{l_3},p_{l_4}\right)}y_{1234,t} = 1$$

Example 2. Consider a function $F(x_1,x_2,x_3,x_4)=x_1x_2x_3x_4$, $1\leq x_i\leq 10$, for $i=1,2,3,4$. $T_{1234}(p_1,p_2,p_3,p_4)$ is defined as (5) where $p_i\in P(D)$ and $P(D)$ is defined in (2). From Proposition 5 above it is known:

$$F(x_1, x_2, x_3, x_4) = \sum_{(p_1,p_2,p_3,p_4)}\ \sum_{t\in T_{1234}((p_1,p_2,p_3,p_4))}\ ty_{1234,t}$$

where:

(i) encompasses the cases where one of the x_i takes value 1 (which is in the domain but not a prime number);

(ii) encompasses the cases where one of the x_i takes value 2;

(iii) encompasses the cases where one of the x_i takes value 3;

(iv) encompasses the cases where one of the x_i takes value 5;

(v) encompasses the case where one of the x_i takes value 7.

(i) Start:

$$T_{123}(1, 1, 1) = T_{12}(1, 1)\times\{1\} = \{1\}\times\{1\} = \{1\}$$

$$T_{123}(1, 1, 2) = T_{123}(1, 2, 1) = T_{123}(1, 1, 1) = T_{12}(1, 1)\times C_{10}(2) = \{1\}\times\{2\ 4\ 8\}$$
$$= \{2\ 4\ 8\}$$

$$T_{123}(1, 1, 3) = T_{123}(1, 3, 1) = T_{123}(3, 1, 1) = T_{12}(1, 1)\times C_{10}(3) = \{1\}\times\{3\ 6\ 9\}$$
$$= \{3\ 6\ 9\}$$

$$T_{123}(1, 1, 5) = T_{123}(1, 5, 1) = T_{123}(1, 5, 1) = T_{12}(1, 1)\times C_{10}(5) = \{1\}\times\{5\ 10\}$$
$$= \{5\ 10\}$$

$$T_{123}(1, 1, 7) = T_{123}(1, 7, 1) = T_{123}(7, 1, 1) = T_{12}(1, 1)\times C_{10}(7) = \{1\}\times\{7\}$$
$$= \{7\}$$

$$T_{123}(1, 2, 2) = T_{123}(2, 1, 2) = T_{123}(2, 2, 1) = T_{12}(1, 2)\times C_{10}(2)$$
$$= \{2\ 4\ 8\}\times\{2\ 4\ 8\} = \{4\ 8\ 16\ 32\ 64\}$$

$$T_{123}(1, 2, 3) = T_{123}(1, 3,) = T_{123}(2, 1, 3) = T_{123}(2, 3, 1) = T_{123}(3, 1, 2) = T_{123}(3, 2, 1)$$
$$= T_{12}(1, 2)\times C_{10}(3) = \{2\ 4\ 8\}\times\{3\ 6\ 9\}$$
$$= \{6\ 12\ 18\ 24\ 36\ 48\ 72\}$$

$$T_{123}(1, 2, 5) = T_{123}(1, 5, 2) = T_{123}(2, 1, 5) = T_{123}(2, 5, 1) = T_{123}(5, 1, 2) = T_{123}(5, 2, 1)$$
$$= T_{12}(1, 2)\times C_{10}(5) = \{2\ 4\ 8\}\times\{5\ 10\} = \{10\ 20\ 40\ 80\}$$

$$T_{123}(1, 2, 7) = T_{123}(1, 7, 2) = T_{123}(2, 1, 7) = T_{123}(2, 7, 1) = T_{123}(7, 1, 2) = T_{123}(7, 2, 1)$$
$$= T_{12}(1, 2)\times C_{10}(7) = \{2\ 4\ 8\}\times\{7\} = \{14\ 28\ 56\}$$

$$T_{123}(1, 3, 3) = T_{123}(3, 1, 3) = T_{123}(3, 3, 1) = T_{12}(1, 3)\times C_{10}(3)$$
$$= \{3\ 6\ 9\}\times\{3\ 6\ 9\} = \{9\ 18\ 27\ 36\ 54\ 81\}$$

$$T_{123}(1, 3, 5) = T_{123}(1, 5, 3) = T_{123}(3, 1, 5) = T_{123}(3, 5, 1) = T_{123}(5, 1, 3) = T_{123}(5, 3, 1)$$
$$= T_{12}(1, 3)\times C_{10}(5) = \{3\ 6\ 9\}\times\{5\ 10\} = \{15\ 30\ 60\ 45\ 90\}$$

$$T_{123}(1, 3, 7) = T_{123}(1, 3, 7) = T_{123}(1, 3, 7) = T_{123}(1, 3, 7) = T_{123}(1, 3, 7) = T_{123}(1, 3, 7)$$
$$= T_{12}(1, 3)\times C_{10}(7) = \{3\ 6\ 9\}\times\{7\} = \{21\ 42\ 63\}$$

$$T_{123}(1, 5, 5) = T_{123}(5, 1, 5) = T_{123}(5, 5, 1) = T_{12}(1, 5)\times C_{10}(5)$$
$$= \{5\ 10\}\times\{5\ 10\} = \{25\ 50\ 100\}$$

-continued $$T_{123}(1, 5, 7) = T_{123}(1, 7, 5) = T_{123}(5, 1, 7) = T_{123}(5, 7, 1) = T_{123}(7, 1, 5) = T_{123}(7, 5, 1)$$
$$= T_{12}(1, 5) \times C_{10}(7) = \{5\ 10\} \times \{7\} = \{35\ 70\}$$

$$T_{123}(1, 7, 7) = T_{123}(7, 1, 7) = T_{123}(7, 7, 1) = T_{12}(1, 1) \times C_{10}(7) = \{(7) \times (7)\}$$
$$= \{49\}$$

(i) End.
(ii) Start:

$$T_{123}(2, 2, 2) = T_{12}(2, 2) \times C_{10}(2) = \{4\ 8\ 16\ 32\ 64\} \times \{2\ 4\ 8\}$$
$$= \{8\ 16\ 32\ 64\ 128\ 256\ 512\}$$

$$T_{123}(2, 2, 3) = T_{123}(2, 3, 2) = T_{123}(3, 3, 2) = T_{12}(2, 2) \times C_{10}(3)$$
$$= \{4\ 8\ 16\ 32\ 64\} \times \{3\ 6\ 9\}$$
$$= \{12\ 24\ 36\ 48\ 72\ 96\ 144\ 192\ 288\ 384\ 576\}$$

$$T_{123}(2, 2, 5) = T_{123}(2, 5, 2) = T_{123}(5, 2, 2) = T_{12}(2, 2) \times C_{10}(5)$$
$$= \{4\ 8\ 16\ 32\ 64\} \times \{5\ 10\} = \{20\ 40\ 80\ 160\ 320\ 640\}$$

$$T_{123}(2, 2, 7) = T_{123}(2, 7, 2) = T_{123}(7, 2, 2) = T_{12}(2, 2) \times C_{10}(7)$$
$$= \{4\ 8\ 16\ 32\ 64\} \times \{7\} = \{28\ 56\ 112\ 224\ 448\}$$

$$T_{123}(2, 3, 3) = T_{123}(3, 2, 3) = T_{123}(3, 3, 2) = T_{12}(2, 3) \times C_{10}(3)$$
$$= \{6\ 12\ 18\ 24\ 36\ 48\ 72\} \times \{3\ 6\ 9\}$$
$$= \{18\ 36\ 54\ 72\ 108\ 162\ 144\ 216\ 324\ 288\ 432\ 648\}$$

$$T_{123}(2, 3, 5) = T_{123}(2, 5, 3) = T_{123}(3, 2, 5) = T_{123}(3, 5, 2) = T_{123}(5, 2, 3) = T_{123}(5, 3, 2)$$
$$= T_{12}(2, 3) \times C_{10}(5) = \{6\ 12\ 18\ 24\ 36\ 48\ 72\} \times \{5\ 10\}$$
$$= \{30\ 60\ 120\ 90\ 180\ 240\ 360\ 480\ 720\}$$

$$T_{123}(2, 3, 7) = T_{123}(2, 7, 3) = T_{123}(3, 2, 7) = T_{123}(3, 7, 2) = T_{123}(7, 2, 3) = T_{123}(7, 3, 2)$$
$$= T_{12}(2, 3) \times C_{10}(7) = \{6\ 12\ 18\ 24\ 36\ 48\ 72\} \times \{7\}$$
$$= \{42\ 84\ 126\ 168\ 252\ 336\ 504\}$$

$$T_{123}(2, 5, 5) = T_{123}(5, 2, 5) = T_{123}(5, 5, 2) = T_{12}(2, 5) \times C_{10}(5)$$
$$= \{10\ 20\ 40\ 80\} \times \{5\ 10\} = \{50\ 100\ 200\ 400\ 800\}$$

$$T_{123}(2, 5, 7) = T_{123}(2, 7, 5) = T_{123}(5, 2, 7) = T_{123}(5, 7, 2) = T_{123}(7, 2, 5) = T_{123}(7, 5, 2)$$
$$= T_{12}(2, 5) \times C_{10}(7) = \{10\ 20\ 40\ 80\} \times \{7\} = \{70\ 140\ 280\ 560\}$$

$$T_{123}(2, 7, 7) = T_{123}(7, 2, 7) = T_{123}(7, 7, 2) = T_{12}(2, 7) \times C_{10}(7)$$
$$= \{4\ 8\ 16\ 32\ 64\} \times \{7\} = \{28\ 56\ 112\ 224\ 448\}$$

40

(ii) End.
(iii) Start:

$$T_{123}(3, 3, 3) = T_{12}(3, 3) \times C_{10}(3) = \{9\ 18\ 27\ 36\ 54\ 81\} \times \{3\ 6\ 9\}$$
$$= \{27\ 54\ 81\ 108\ 162\ 243\ 216\ 324\ 486\ 729\}$$

$$T_{123}(3, 3, 5) = T_{123}(3, 5, 3) = T_{123}(5, 3, 3) = T_{12}(3, 3) \times C_{10}(5)$$
$$= \{9\ 18\ 27\ 36\ 54\ 81\} \times \{5\ 10\} = \{45\ 90\ 180\ 135\ 270\ 360\ 540\ 405\ 810\}$$

$$T_{123}(3, 3, 7) = T_{123}(3, 7, 3) = T_{123}(7, 3, 3) = T_{12}(3, 3) \times C_{10}(7)$$
$$= \{9\ 18\ 27\ 36\ 54\ 81\} \times \{7\} = \{63\ 126\ 189\ 252\ 378\ 567\}$$

$$T_{123}(3, 5, 5) = T_{123}(5, 3, 5) = T_{123}(5, 5, 3) T_{12}(3, 5) \times C_{10}(5)$$
$$= \{15\ 30\ 60\ 45\ 90\} \times \{5\ 10\} = \{75\ 150\ 300\ 600\ 225\ 450\ 900\}$$

$$T_{123}(3, 5, 7) = T_{123}(3, 7, 5) = T_{123}(5, 3, 7) = T_{123}(5, 7, 3) = T_{123}(7, 3, 5) = T_{123}(7, 5, 3)$$
$$= T_{12}(3, 5) \times C_{10}(7) = \{15\ 30\ 60\ 45\ 90\} \times \{7\} = \{105\ 210\ 420\ 315\ 630\}$$

$$T_{123}(3, 7, 7) = T_{123}(7, 3, 7) = T_{123}(7, 7, 3) = T_{12}(3, 7) \times C_{10}(75)$$
$$= \{21\ 42\ 63\} \times 7 = \{147\ 294\ 441\}$$

(iii) End.
(iv) Start:

$$T_{123}(5, 5, 5) = T_{12}(5, 5) \times C_{10}(5) = \{25\ 50\ 100\} \times \{5\ 10\} = \{125\ 250\ 500\ 1000\}$$

$$T_{123}(5, 5, 7) = T_{123}(5, 7, 5) = T_{123}(7, 5, 5) = T_{12}(5, 5) \times C_{10}(7) = \{25\ 50\ 100\} \times \{7\}$$
$$= \{175\ 350\ 700\}$$

-continued $$T_{123}(5, 7, 7) = T_{123}(7, 5, 7) = T_{123}(7, 7, 5) = T_{12}(5, 7) \times C_{10}(7) = \{35\ 70\} \times \{7\}$$
$$= \{245\ 490\}$$

$$T_{123}(7, 7, 7) = T_{12}(7, 7) \times C_{10}(7) = \{49\} \times \{7\} = \{343\}$$

(iv) End.

$$T_{123}(7, 7, 7) = T_{12}(7, 7) \times C_{10}(7) = \{49\} \times \{7\} = \{343\} \qquad (v)$$

The P-Map for $$T_{1234}(p_{l_1}, p_{l_2}, p_{l_3}, p_{l_4}),$$

i.e., a prime-scheme-map P-map $(x_1, x_2 x_3 x_4, M=10)$, is shown in Table 5. Where all product values are put on 625 clusters (but only 70 different clusters) $T_{1234}(1,1)$, $T_{1234}(1, 1,1,2)$, . . . , and $T_{1234}(7,7,7,7)$ are independent of each other.

TABLE 5

| $x_1$ | $x_4$ | | | | | | | | | |
|---|---|---|---|---|---|---|---|---|---|---|
| | 1 | 2 | 4 | 8 | 3 | 6 | 9 | 5 | 10 | 7 |
| | $x_2 x_3$ | | | | | | | | | |
| 1 | 1 | 2 | 4 | 8 | 3 | 6 | 9 | 5 | 10 | 7 |
| 2 | 2 | 4 | 8 | 16 | 6 | 12 | 18 | 10 | 20 | 14 |
| 4 | 4 | | | 32 | | 24 | 36 | | 40 | 28 |
| 8 | 8 | | | 64 | | 48 | 72 | | 80 | 56 |
| 3 | 3 | 6 | 12 | 24 | 9 | 18 | 27 | 15 | 30 | 21 |
| 6 | 6 | | | 48 | | 36 | 54 | | 60 | 42 |
| 9 | 9 | 18 | 36 | 72 | | | 81 | 45 | 90 | 63 |
| 5 | 5 | 10 | 20 | 40 | 15 | 30 | 45 | 25 | 50 | 35 |
| 10 | 10 | | | 80 | | 60 | 90 | | 100 | 70 |
| 7 | 7 | 14 | 28 | 56 | 21 | 42 | 63 | 35 | 70 | 49 |
| . . . | . . . | | . . . | | | . . . | | . . . | | . . . |
| 27 | 27 | 54 | 108 | 216 | 81 | 162 | 243 | 135 | 270 | 189 |
| 54 | 54 | | | 432 | | 324 | 486 | | 540 | 378 |
| 81 | 81 | 162 | 324 | 648 | | | 729 | 405 | 810 | 567 |
| 108 | 108 | | | 864 | | 648 | 972 | | 1080 | 756 |
| 162 | 162 | | | 1296 | | | 1458 | | 1620 | 1134 |
| 243 | 243 | 486 | 972 | 1944 | | | 2187 | 1215 | 2430 | 1701 |
| 216 | 216 | | | 1728 | | 1296 | 1944 | | 2160 | 1512 |
| 324 | 324 | | | 2592 | | | 2916 | | 3240 | 2268 |
| 486 | 486 | | | 3888 | | | 4374 | | 4860 | 3402 |
| 729 | 729 | 1458 | 2916 | 5832 | | | 6561 | 3645 | 7290 | 5103 |
| . . . | . . . | | . . . | | | . . . | | . . . | | . . . |
| 49 | 49 | 98 | 196 | 392 | 147 | 294 | 441 | 245 | 490 | 343 |
| 98 | 98 | 196 | 392 | 784 | 294 | 588 | 882 | 490 | 980 | 686 |
| 196 | 196 | | | 1568 | | 1176 | 1764 | | 1960 | 1372 |
| 392 | 392 | | | 3136 | | 2352 | 3528 | | 3920 | 2744 |
| 147 | 147 | 294 | 588 | 1176 | 441 | 882 | 1323 | 735 | 1470 | 1029 |
| 294 | 294 | | | 2352 | | | 2646 | | 2940 | 2058 |
| 441 | 441 | 882 | 1764 | 3528 | | | 3969 | 2205 | 4410 | 3087 |
| 245 | 245 | 1490 | 980 | 1960 | 735 | 1470 | 2205 | 1225 | 2450 | 1715 |
| 490 | 490 | | | 3920 | | 2940 | 4410 | | 4900 | 3430 |
| 343 | 343 | 686 | 1372 | 2744 | 1029 | 2058 | 3087 | 1715 | 3430 | 2401 |

In one aspects, the present invention uses parallel processing.

Theorem 1. An EDOP in (1) can be partitioned into subprograms SP(1), SP(2), SP(3), . . . , SP($\alpha_Q$). The best solution of these subprograms is the optimal solution of the EDOP in (1).

Example 3. Consider an EDOP with three integer variables:

$$OEDP: \text{Min} F_{123}(x_1, x_2, x_3) = x_1 x_2 + x_1^2 x_2 + x_1^2 x_3 + x_1 x_2 x_3$$

$$x_i \in \{2, 3, 4, 5\} \ \langle \text{To simplify computation, } x_i \text{ do not include 1} \rangle$$

$$ax_1 + bx_2 + cx_3 \geq d.$$

Here, $P(m)=\{2,3,5\}$, i.e., $m'=3$. And there are three variables $x_1$, $x_2$ and $x_3$, i.e. If there are more than $3^3=27$ online processors available, then we can choose $\alpha=3$, such that $\alpha_Q=3^3=27$. Therefore this EDOP is partitioned into 27 subprograms. The product values for $$x_1 x_2, x_1^2 x_3 \text{ and } x_1^2 x_2, x_1 x_2 x_3$$

are listed in Tables 6-8, respectively.

TABLE 6

| $x_1$ | $x_2$ | | | |
|---|---|---|---|---|
| | 2 | 4 | 3 | 5 |
| 2 | 4 | 8 | 6 | 10 |
| 4 | | 16 | 12 | 20 |
| 3 | 6 | 12 | 9 | 15 |
| 5 | 10 | 20 | 15 | 25 |

TABLE 7

| $x_1^2$ | $x_2$ or $x_3$ | | | |
|---|---|---|---|---|
| | 2 | 4 | 3 | 5 |
| 4 | 8 | 16 | 12 | 20 |
| 16 | 32 | 64 | 48 | 80 |
| 9 | 18 | 36 | 27 | 45 |
| 25 | 50 | 100 | 75 | 125 |

TABLE 8

| $x_1 x_2$ | $x_3$ | | | |
|---|---|---|---|---|
| | 2 | 4 | 3 | 5 |
| 4 | 8 | 16 | 12 | 20 |
| 8 | | 32 | 24 | 40 |
| 16 | | 64 | 48 | 80 |
| 6 | 12 | 24 | 18 | 30 |
| 12 | | 48 | 36 | 60 |
| 10 | 20 | 40 | 30 | 50 |
| 20 | | 80 | 60 | 100 |
| 6 | 12 | 24 | 18 | 30 |
| 12 | | 48 | 36 | 60 |
| 9 | 18 | 36 | 27 | 45 |
| 15 | 30 | 60 | 45 | 75 |
| 10 | 20 | 40 | 30 | 50 |
| 20 | | 80 | 60 | 100 |
| 25 | 50 | 100 | 75 | 125 |

This then leads to:

$$T_{12}(2, 2) = \{4\ 8\ 16\}$$

$$T_{12}(2, 3) = T_{12}(3, 2) = \{6\ 12\}$$

$$T_{12}(2, 5) = T_{12}(5, 2)\{10\ 20\}$$

$$T_{12}(3, 3) = \{9\}$$

$$T_{12}(3, 5) = T_{12}(5, 3) = \{15\}$$

$$T_{12}(5, 5) = \{25\}$$

$$T_{1_2_2}(2, 2) = T_{1_2_3}(2, 2) = \{8\ 16\ 32\ 64\}$$

$$T_{1_2_2}(2, 3) = T_{1_2_3}(2, 3) = \{12\ 48\}$$

$$T_{1_2_2}(2, 5) = T_{1_2_3}(2, 5) = \{20\ 80\}$$

$$T_{1_2_2}(3, 2) = T_{1_2_3}(3, 2) = \{18\ 36\}$$

$$T_{1_2_2}(3, 3) = T_{1_2_3}(3, 3) = \{27\}$$

$$T_{1_2_2}(3, 5) = T_{1_2_3}(3, 5) = \{45\}$$

$$T_{1_2_2}(5, 2) = T_{1_2_3}(5, 2) = \{50\ 100\}$$

$$T_{1_2_2}(5, 3) = t_{1_2_3}(5, 3) = \{75\}$$

$$T_{1_2_2}(5, 5) = T_{1_2_3}(5, 5) = \{125\}$$

$$T_{123}(2, 2, 2) = \{8\ 16\ 32\ 64\}$$

$$T_{123}(2, 2, 3) = T_{123}(2, 3, 2) = T_{123}(3, 2, 2) = \{12\ 24\ 48\}$$

$$T_{123}(2, 2, 5) = T_{123}(2, 5, 2) = T_{123}(5, 2, 2) = \{20\ 40\ 80\}$$

$$T_{123}(2, 3, 3) = T_{123}(3, 2, 3) = T_{123}(3, 3, 2) = \{18\ 36\}$$

$$T_{123}(2, 3, 5) = T_{123}(2, 5, 3) =$$

$$T_{123}(3, 2, 5) = T_{123}(3, 5, 2) = T_{123}(5, 2, 3) = T_{123}(5, 3, 2) = \{30\ 60\}$$

$$T_{123}(2, 5, 5) = T_{123}(5, 2, 5) = T_{123}(5, 5, 2) = \{50\ 100\}$$

$$T_{123}(3, 3, 3) = \{27\}$$

$$T_{123}(3, 3, 5) = T_{123}(5, 3, 3) = T_{123}(3, 5, 3) = \{45\}$$

$$T_{123}(3, 5, 5) = T_{123}(5, 3, 5) = T_{123}(5, 5, 3) = \{75\}$$

$$T_{123}(5, 5, 5) = \{125\}$$

Then, the 27 subproblems SP(1), SP(2), . . . ,SP(27) related to the $$x_1 x_2,\ x_1^2 x_2 \text{ and } x_1^2 x_3,\ x_1 x_2 x_3$$

values can be listed as in Table 9. Here, the number of available parallel processors is assumed to be 27 or more.

TABLE 9

| subproblems | | variabl | | product sets of polynomial terms | | | |
|---|---|---|---|---|---|---|---|
| | | | | $x_1 x_2, x_1^2 x_2$ | | $x_1^2 x_3$ | |
| $x_1$ | $x_2$ | $x_3$ | | | | | $x_1 x_2 x_3$ |
| SP(1) | 2 4 | 2 4 | 2 4 | $T_{12}(2, 2), T_{1^2_2}(2, 2)$ | $T_{1^2_3}(2, 2)$ | | $T_{123}(2, 2, 2)$ |
| SP(2) | 2 4 | 2 4 | 3 | $T_{12}(2, 2), T_{1^2_2}(2, 2)$ | $T_{1^2_3}(2, 3)$ | | $T_{123}(2, 2, 3)$ |
| SP(3) | 2 4 | 2 4 | 5 | $T_{12}(2, 2), T_{1^2_2}(2, 2)$ | $T_{1^2_3}(2, 5)$ | | $T_{123}(2, 2, 5)$ |
| SP(4) | 2 4 | 3 | 2 4 | $T_{12}(2, 3), T_{1^2_2}(2, 3)$ | $T_{1^2_3}(2, 2)$ | | $T_{123}(2, 3, 2)$ |
| SP(5) | 2 4 | 3 | 3 | $T_{12}(2, 3), T_{1^2_2}(2, 3)$ | $T_{1^2_3}(2, 3)$ | | $T_{123}(2, 3, 3)$ |
| SP(6) | 2 4 | 3 | 5 | $T_{12}(2, 3), T_{1^2_2}(2, 3)$ | $T_{1^2_3}(2, 5)$ | | $T_{123}(2, 3, 5)$ |
| SP(7) | 2 4 | 5 | 2 4 | $T_{12}(2, 5), T_{1^2_2}(2, 5)$ | $T_{1^2_3}(2, 2)$ | | $T_{123}(2, 5, 2)$ |
| SP(8) | 2 4 | 5 | 3 | $T_{12}(2, 5), T_{1^2_2}(2, 5)$ | $T_{1^2_3}(2, 3)$ | | $T_{123}(2, 5, 3)$ |
| SP(9) | 2 4 | 5 | 5 | $T_{12}(2, 5), T_{1^2_2}(2, 5)$ | $T_{1^2_3}(2, 5)$ | | $T_{123}(2, 5, 5)$ |

TABLE 9-continued

| subproblems | | variabl | | product sets of polynomial terms | | | |
|---|---|---|---|---|---|---|---|
| | | | | $x_1 x_2, x_1^2 x_2$ | | $x_1^2 x_3$ | |
| $x_1$ | $x_2$ | $x_3$ | | | | | $x_1 x_2 x_3$ |
| SP(10) | 3 | 2 4 | 2 4 | $T_{12}(3, 2), T_{1^2_2}(3, 2)$ | $T_{1^2_3}(3, 2)$ | | $T_{123}(3, 2, 2)$ |
| SP(11) | 3 | 2 4 | 3 | $T_{12}(3, 2), T_{1^2_2}(3, 2)$ | $T_{1^2_3}(3, 3)$ | | $T_{123}(3, 2, 3)$ |
| SP(12) | 3 | 2 4 | 5 | $T_{12}(3, 2), T_{1^2_2}(3, 2)$ | $T_{1^2_3}(3, 5)$ | | $T_{123}(3, 2, 5)$ |
| SP(13) | 3 | 3 | 2 4 | $T_{12}(3, 3), T_{1^2_2}(3, 3)$ | $T_{1^2_3}(3, 2)$ | | $T_{123}(3, 3, 2)$ |
| SP(14) | 3 | 3 | 3 | $T_{12}(3, 3), T_{1^2_2}(3, 3)$ | $T_{1^2_3}(3, 3)$ | | $T_{123}(3, 3, 3)$ |
| SP(15) | 3 | 3 | 5 | $T_{12}(3, 3), T_{1^2_2}(3, 3)$ | $T_{1^2_3}(3, 5)$ | | $T_{123}(3, 3, 5)$ |
| SP(16) | 3 | 5 | 2 4 | $T_{12}(3, 5), T_{1^2_2}(3, 5)$ | $T_{1^2_3}(3, 2)$ | | $T_{123}(3, 5, 2)$ |
| SP(17) | 3 | 5 | 3 | $T_{12}(3, 5), T_{1^2_2}(3, 5)$ | $T_{1^2_3}(3, 3)$ | | $T_{123}(3, 5, 3)$ |
| SP(18) | 3 | 5 | 5 | $T_{12}(3, 5), T_{1^2_2}(3, 5)$ | $T_{1^2_3}(2, 5)$ | | $T_{123}(3, 5, 5)$ |
| SP(19) | 5 | 2 4 | 24 | $T_{12}(5, 2), T_{1^2_2}(5, 2)$ | $T_{1^2_3}(5, 2)$ | | $T_{123}(5, 2, 2)$ |
| SP(20) | 5 | 2 4 | 3 | $T_{12}(5, 2), T_{1^2_2}(5, 2)$ | $T_{1^2_3}(5, 3)$ | | $T_{123}(5, 2, 3)$ |
| SP(21) | 5 | 2 4 | 5 | $T_{12}(5, 2), T_{1^2_2}(5, 2)$ | $T_{1^2_3}(5, 5)$ | | $T_{123}(5, 2, 5)$ |
| SP(22) | 5 | 3 | 2 4 | $T_{12}(5, 3), T_{1^2_2}(5, 3)$ | $T_{1^2_3}(5, 2)$ | | $T_{123}(5, 3, 2)$ |
| SP(23) | 5 | 3 | 3 | $T_{12}(5, 3), T_{1^2_2}(5, 3)$ | $T_{1^2_3}(5, 3)$ | | $T_{123}(5, 3, 3)$ |
| SP(24) | 5 | 3 | 5 | $T_{12}(5, 3), T_{1^2_2}(5, 3)$ | $T_{1^2_3}(5, 5)$ | | $T_{123}(5, 3, 5)$ |
| SP(25) | 5 | 5 | 2 4 | $T_{12}(5, 5), T_{1^2_2}(5, 5)$ | $T_{1^2_3}(5, 2)$ | | $T_{123}(5, 5, 2)$ |
| SP(26) | 5 | 5 | 3 | $T_{12}(5, 5), T_{1^2_2}(5, 5)$ | $T_{1^2_3}(5, 3)$ | | $T_{123}(5, 5, 3)$ |
| SP(27) | 5 | 5 | 5 | $T_{12}(5, 5), T_{1^2_2}(5, 5)$ | $T_{1^2_3}(5, 5)$ | | $T_{123}(5, 5, 5)$ |

$SP(1)$: Min $f_1(X) =$ $$\sum_{t \in T_{12}(2,2)} ty_{12,t} + \sum_{t \in T_{1_2_2}(2,2)} ty_{1_2_2,t} + \sum_{t \in T_{1_2_3}(2,2)} ty_{1_2_3,t} + \sum_{t \in T_{123}(2,2,2)} ty_{123,t}$$

s.t. $ax_1 + bx_2 + cx_3 \geq d$ $$\left.\begin{array}{l} x_i = 2u_{i2} + 4u_{i4} \\ u_{i2} + u_{i4} = 1 \end{array}\right\} \text{ for } i = 1, 2, 3$$

$$A\begin{cases} y_{12,4} \geq u_{1,2} + u_{2,2} - 1 \\ y_{12,8} \geq u_{1,2} + u_{2,4} - 1, \quad y_{12,8} \geq u_{1,4} + u_{2,2} - 1 \\ y_{12,16} \geq u_{1,2} + u_{2,8} - 1, \quad y_{12,16} \geq u_{1,4} + u_{2,4} - 1, \quad y_{12,16} \geq u_{1,8} + u_{2,2} - 1 \\ y_{12,4} + y_{12,8} + y_{12,16} = 1 \end{cases}$$

$$B\begin{cases} y_{1_2_2,8} \geq u_{1,2} + u_{2,4} - 1 \\ \vdots \\ y_{1_2_2,64} \geq u_{1,4} + u_{2,4} - 1 \\ y_{1_2_2,8} + y_{1_2_2,16} + y_{1_2_2,32} + y_{1_2_2,64} = 1 \end{cases}$$

$$C\begin{cases} y_{1_2_3,8} \geq u_{1,2} + u_{3,2} - 1 \\ \vdots \\ y_{1_2_3,64} \geq u_{1,4} + u_{3,4} - 1 \\ y_{1_2_3,8} + y_{1_2_3,16} + y_{1_2_3,32} + y_{1_2_3,64} = 1 \end{cases}$$

$$D\begin{cases} y_{123,8} \geq u_{1,2} + u_{2,2} + u_{3,2} - 2 \\ \vdots \\ y_{123,64} \geq u_{1,2} + u_{2,3} + u_{3,4} - 2, \quad y_{123,64} \geq u_{1,3} + u_{2,2} + u_{3,4} - 2 \\ y_{123,8} + y_{123,16} + y_{123,32} + y_{123,64} = 1 \end{cases}$$

$y_{12,t}, y_{1_2_2,t}, y_{1_2_3,t}, y_{123,t} \geq 0.\ u_{1,2}, u_{1,4}, u_{2,2}, u_{2,4}, u_{3,2}, u_{3,4} \in \{0, 1\}.$ The present invention includes various aspects, and, in general, proposes a parallel solver referred to herein as "PARA235" to solve an Optimal Engineering Design Problem (EDOP), generally expressed as:

*EDOP*: Minimize $F(X)$

Subject to $X = (x_1, x_2, \ldots, x_n)$, $X \in$ Feasible set, $x_i \in \{2, \ldots, m\}$, for $i = 1, 2, \ldots, n$;

where X is a decision vector with n integer variables $x_1, x_2, \ldots, x_n$ and $F(x_1, x_2, \ldots, x_n)$ is a polynomial integer function. The possible integer values contained in $x_i$ (for i=1,2, . . . ,n) are 2,3, . . . ,m. Denote $$m_i^\Delta$$

the maximal prime number small or equal to $m_i$.

By re-expressing $x_i$ as $$x_i = \{2, 4, 8, 16, \ldots\} \cup \{3, 6, 9, \ldots\} \cup$$

$$\{5, 10, 15, \ldots\} \cup \ldots \cup \{m_i^\Delta, 2m_i^\Delta, 3m_i^\Delta, \ldots\},$$

PARA235 can divide the Main Program into at most $$m_1^\Delta \times m_2^\Delta \times m_2^\Delta \times \ldots m_n^\Delta$$

subprograms. For instance, if n=3 and $m_1=10$ and $m_2=m_3=18$, then $x_1=\{2,4,8\}\cup\{3,6,9\}\cup\{5,10\}\cup\{7\}$, $x_2=x_3=\{2,4,8,16\}\cup\{3,6,9,12,18\}\cup\{5,10,15\}\cup\{7, 14\}\cup\{11\}\cup\{13\}\cup\{17\}$. PARA235 can divide the Main Program into at most 4×7×7=196 subprograms.

Users can decide how many subprograms they want to divide, however, the maximal number of divided subprograms cannot exceed their available processors. For instance, if a user has only 32 processors available, the user can specify $x_1$, $x_2$ and $x_3$ as $x_1=\{2,4,8,3,6,9\}\cup\{5,10,7\}$ $x_2=x_3=\{2,4,8,16\}\cup\{3,6,9,12,18\}\cup\{5,10,15\}\cup\{7,14,11,13, 17\}$. PARA235 can divide the Main Program into at most 2×4×4=32 subprograms.

All subprograms divided by PARA235 above are independent of each other. That means there are few, if any, same product values between any two subprograms (as proven in Theorem 1 and Theorem 2).

Each of those subprograms can be reformulated more effectively. That means each subprogram can be expressed using fewer continuous variables and linear constraints.

The following is one example generally showing the formulation of an EDOP and its subproblems.

The EDOP containing n discrete variables generally have the signomial formulation for both objective and constraints, that is:

$$f(x_1, x_2, \ldots, x_n) = \sum_{i=1}^{M}\left(c_i \prod_{j=1}^{n} x_j^{a_{ij}}\right)$$

To apply the method of one example of the invention, the signomial formulation may be reformulated as shown:

$$\min F(X) = a_0 + \sum_{i=1}^{n} a_i x_i^{j_i} + \sum_{i_2 > i_1} F_{i_1 i_2}(x_{i_1}, x_{i_2}) +$$

$$\sum_{i_3 > i_2 > i_1} F_{i_1 i_2 i_3}(x_{i_1}, x_{i_2}, x_{i_3}) + \ldots + F_{12 \ldots n}(x_1, x_2, \ldots, x_n)$$

$$\text{s.t. } h_k(x_1, x_2, \ldots, x_n) \geq 0 \text{ for } k = 1, 2, \ldots, K,$$

$$x_i \in X_i \text{ for } i = 1, 2, \ldots, n,$$

-continued where $$F_{i_1 i_2}(x_{i_1}, x_{i_2}) = \sum_{l=1}^{n_{i_1 i_2}} a_{i_1 i_2, l} x_{i_1}^{j_{1,l}} x_{i_2}^{j_{2,l}},$$

$$F_{i_1 i_2 i_3}(x_{i_1}, x_{i_2}) = \sum_{l=1}^{n_{i_1 i_2 i_3}} a_{i_1 i_2 i_3, l} x_{i_1}^{j_{1,l}} x_{i_2}^{j_{2,l}} x_{i_3}^{j_{3,l}},$$

...

$$F_{i_1 i_2 \ldots i_n}(x_{i_1}, x_{i_2}, \ldots, x_{i_n}) = \sum_{l=1}^{n_{i_1 i_2 \ldots i_n}} a_{i_1 i_2 \ldots i_n, l} x_{i_1}^{j_{1,l}} x_{i_2}^{j_{2,l}} \ldots x_{i_n}^{j_{n,l}},$$

$$h_k(x_1, x_2, \ldots, x_n) = b_{0,k} + \sum_{i=1}^{n} b_{i,k} x_i, \text{ for } k = 1, 2, \ldots, K,$$

$X_i$ is a discrete set, for $i = 1, 2, \ldots, n$.

In one example, the reformulation may be performed in five steps, not necessarily in this exact order, as follows:

Step 1. Adjust variables' scales in original EDOP. For each i=1,2, . . . ,n, assume $$X_i = \{x_{i,1} \times 10^{\alpha_{i,1}}, x_{i,2} \times 10^{\alpha_{i,2}}, \ldots, x_{i,m_i} \times 10^{\alpha_{i,m_i}}\},$$

where $x_{i,j}$ and $\alpha_{i,j}$ are integer, for $$j = 1, 2, \ldots, m_i. \text{ Let } q_i = \min_{j \in 1, 2, \ldots, m_i} \alpha_{i,j}.$$

An adjustment may then be made. $x_i$ as $x_i'=x_i \times 10^{-q_i}$ for i=1,2, . . . , n. Thus, replace the $$x_{i_1}^{j_{1,l}} x_{i_2}^{j_{2,l}} \ldots x_{i_s}^{j_{s,l}} \text{ by } x_{i_1}'^{j_{1,l}} x_{i_2}'^{j_{2,l}} \ldots x_{i_s}'^{j_{s,l}} \times 10^{q_{i_1} + q_{i_2} + \ldots + q_{i_s}}.$$

Step 2. Reformulate the EDOP as:

$$\min F(X') = a_0 + \sum_{i=1}^{n} a_i' x_i'^{j_i} + \sum_{i_2 > i_1} F_{i_1 i_2}(x_{i_1}', x_{i_2}') +$$

$$\ldots + \sum_{i_3 > i_2 > i_1} F_{i_1 i_2 i_3}(x_{i_1}', x_{i_2}', x_{i_3}') \ldots + F_{12 \ldots n}'(x_1', x_2', \ldots, x_n')$$

s.t.

$$h_k'(x_1', x_2', \ldots, x_n') \geq 0 \text{ for } k = 1, 2, \ldots, K$$

$$x_i \in X_i' \text{ for } i = 1, 2, \ldots, n$$

where $$F_{i_1 i_2}'(x_{i_1}', x_{i_2}') = \sum_{l=1}^{n_{i_1 i_2}} a_{i_1 i_2, l}' x_{i_1}'^{j_{1,l}} x_{i_2}'^{j_{2,l}},$$

$$F_{i_1 i_2 i_3}'(x_{i_1}', x_{i_2}') = \sum_{l=1}^{n_{i_1 i_2 i_3}} a_{i_1 i_2 i_3, l}' x_{i_1}'^{j_{2,l}} x_{i_3}'^{j_{3,l}},$$

...

$$F_{i_1 i_2 \ldots i_n}'(x_{i_1}', x_{i_2}', \ldots, x_{i_n}') = \sum_{l=1}^{n_{i_1 i_2 \ldots i_n}} a_{i_1 i_2 \ldots i_n, l}' x_{i_1}'^{j_{1,l}} x_{i_2}'^{j_{2,l}} \ldots x_{i_n}'^{j_{n,l}},$$

$$h_k'(x_1', x_2', \ldots, x_n') = b_{0,k} + \sum_{i=1}^{n} b_{i,k}' x_i, \text{ for } k = 1, 2, \ldots, K,$$

$X_i'$ is an integer set, for $i = 1, 2, \ldots, n$.

Step 3. The available N processors (i.e., parallel processors) are identified.

Step 4. Generation of N subprograms:

$$\text{For } i = 1, 2, \cdots, n, X_i' = \{x_{i,1}', x_{i,2}', \cdots, x_{i,m_i}'\}$$

is an integer set. Let $P_{ij}$ be the set of prime numbers which $x'_{i,j}$ could be decomposed into, for $j=1,2, \ldots ,m_i$. Let $$P_i = \bigcup_{j=1}^{m_i} P_{ij}.$$

If N≤the size of $P_i$, N prime numbers are chosen from $P_i$ as $q_{i1}$, $q_{i2}$, . . . , $q_{in}$; otherwise, some prime numbers are repeated to get $q_{i1}$, $q_{i2}$, . . . , $q_{in}$. Then, for each t=1,2, . . . , N, a subprogram is generated with numbers in $X'_i$ whose biggest prime number is no more than $q_{it}$, for i=1,2, . . . ,n.

Step 5. The subprograms are solved in parallel using the N processors; one subprogram for each processor.

In one embodiment, an example algorithm usable for parallel processing of the subprograms is provided below.

---

Algorithm Example 1: Parallel Computing for EDOP:

---

Require:
    Objective function F(X) = F $(x_1, x_2, \ldots, x_n)$, constraints
    $h_k$ $(x_1, x_2, \ldots, x_n)$, k = 1, 2, . . . , K, the number of available online
    computers
    N and variables domains $D_i$, i = 1, 2, . . . , N.
Ensure:
    F* and X*;
1: According to N, applying prime-based method to partition
    variables domains into $a_1, a_2, \ldots, a_n$ respectively for $x_1, x_2, \ldots,$
$x_n$.
2: i = 1;

3: for $w = 1, 2, \ldots , \prod_{i=1}^{n} a_i$ do

4:   Check the feasibility of values domains;
5:   Formulate subproblem SP (w);
6:   i = i + 1;
7: end for
8: Parallelly solving subproblems SP (1), SP (2), . . . , SP (N) to get
    F* (1), F* (2), . . . , F*(N) and X*(1), X*(2), . . . , X*(N);

9: return $F^* = \min_{i \in \{1,2,\ldots,N\}} F^*(i)$ and $$X^* = \operatorname*{argmin}_{i \in \{1,2,\ldots,N\}} F^*(i)$$

---

Some commonly used practical EDOP cases in the literature are tested below to illustrate the merits of one or more aspects of the present invention.

To compare PARA235 with the Enumeration Method, three practical EDOP cases are tested below. A review of the Enumeration Method was described previously.

Figure 3:
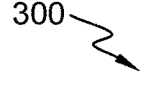
FIG. 3 illustrates a three-bar truss problem, usable with one or more aspects of the present invention.
Figure 3:
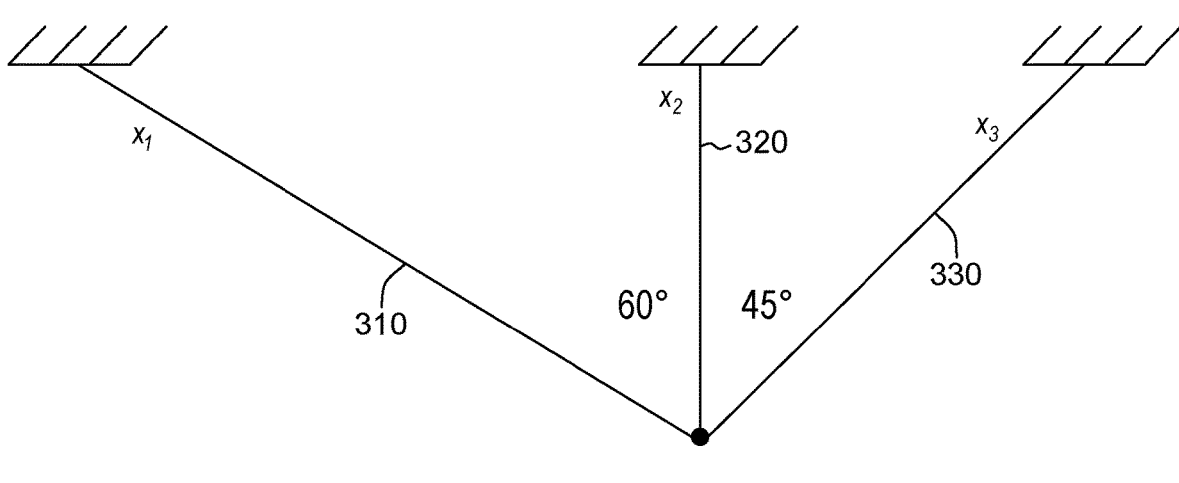

The first example is the three-bar truss problem widely known in the art and described with respect to FIG. 3. The indeterminate three-bar truss 300 is subject to vertical and horizontal forces. Bar 310 is at a 60 degree angle with respect to Bar 320 and Bar 320 is at a 45 degree angle with respect to Bar 330. The weight is minimized under the constraint that the stress in all members should be smaller than the allowable stress.

Program 1 (main program):

$$\text{Min } obj = 2x_1 + x_2 + \sqrt{2}\,x_3$$

$$\text{s.t. } -1 + \frac{\sqrt{3}\,x_2 + 1.932x_3}{1.5x_1x_2 + \sqrt{2}\,x_2x_3 + 1.319x_1x_3} \le 0,$$

$$-1 + \frac{0.634x_1 + 2.828x_3}{1.5x_1x_2 + \sqrt{2}\,x_2x_3 + 1.319x_1x_3} \le 0,$$

$$-1 + \frac{0.5x_1 - 2x_2}{1.5x_1x_2 + \sqrt{2}\,x_2x_3 + 1.319x_1x_3} \le 0,$$

$$-1 + \frac{-0.5x_1 + 2x_2}{1.5x_1x_2 + \sqrt{2}\,x_2x_3 + 1.319x_1x_3} \le 0,$$

where $x_1$, $x_2$ and $x_3$ are discrete variables, $x_i \in \{2, 3, \ldots, 24\}$ for $i = 1, 2, 3$.

In this case, there are three cross terms with different variables, i.e., $x_1x_2$, $x_1x_3$, and $x_2x_3$. These three cross-terms can be linearized and then solve the main program of Program 1. The number of discrete variables, continuous variables, constraints, CPU running time, and the optimal solution for the main program are listed in Table 10. With regard to the optimal solution, the length of Bar 310: x_1=2 units, Bar 320: x_2=2 units, and Bar 330: x_3=2 units, respectively, and the minimum weight is 8.828 units.

TABLE 10

| variables | $x_1$ | $x_2$ | $x_3$ |
|---|---|---|---|
| variables' domains | {2, 3, . . . , 24} | {2, 3, . . . ,24} | {2, 3, . . . , 24} |
| number of discrete variables | | 69 | |
| number of continuous variables | | 1590 | |
| number of constraints | | 48672 | |
| CPU running time (seconds) | | 6.1 | |
| optimal solution | | (2, 2, 2) | |
| optimal value | | 8.828 | |

Test 1 (Enumeration)

Step 1. Suppose there are 8 available processors, i.e., A=8.

Step 2. Divide each $x_i$ into 2 clusters, i.e., [2,3,4,5,6,7,8,9,10,11,12] and [13,14,15,16,17,18,19,20,21,22,23,24] then generate 8 subprograms. All these subprograms are feasible.

Step 3. Solving subprograms.

The results solving the eight subprograms using the enumeration method are given in Table 11. The best solution is in SP(1), where the optimal solution is the same as the Main Program. The number of the continuous variables, constraints and the CPU running time is respectively 369, 5329 and 0.13.

TABLE 11

| subprogram | SP(1) | SP(2) | SP(3) | SP(4) |
|---|---|---|---|---|
| number of discrete variables | 33 | 34 | 34 | 34 |
| number of continuous variables | 369 | 380 | 380 | 380 |
| number of constraints | 5328 | 5812 | 5812 | 5812 |

TABLE 11-continued

| | | | | |
|---|---|---|---|---|
| CPU running time (seconds) | 0.13 | 0.17 | 0.11 | 0.089 |
| optimal solution | (2, 2, 2) | (2, 2, 13) | (2, 13, 2) | (2, 13, 13) |
| optimal value | 8.828 | 13.21 | 19.83 | 24.21 |

| subprogram | SP(5) | SP(6) | SP(7) | SP(8) |
|---|---|---|---|---|
| number of discrete variables | 35 | 35 | 35 | 36 |
| number of continuous variables | 391 | 391 | 391 | 438 |
| number of constraints | 6340 | 6340 | 6340 | 6916 |
| CPU running time (seconds) | 0.10 | 0.21 | 0.11 | 0.047 |
| optimal solution | (13, 2, 2) | (13, 2, 13) | (13, 13, 2) | (13, 13, 13 |
| optimal value | 30.83 | 35.21 | 41.83 | 46.21 |

Test 2 (PARA235):

Step 1. Suppose there are 8 available processors, i.e., A=8.

Step 2. Divide each $x_i$ into 2 clusters, i.e., [2,4,8,16,3,6, 9,12,18,24] and [5,10,15,20,7,14,21,11,22,13,17,19, 23] and generate subprograms. All these subprograms are feasible.

Step 3. Solving subprograms.

The total result is described in Table 12. The best solution is in subprogram (1), where the optimal solution is the same as in the Main Program and in the Enumeration Method (i.e., "(2,2,2)"). However, the number of the continuous variables and constraints is only about half of that in the Enumeration Method, which is why the CPU running time (i.e., 0.064 seconds) of the present invention is shorter than in the Enumeration Method.

TABLE 12

| subprogram | SP(1) | SP(2) | SP(3) | SP(4) |
|---|---|---|---|---|
| number of discrete variables | 30 | 33 | 33 | 33 |
| number of continuous variables | 112 | 138 | 138 | 138 |
| number of constraints | 2784 | 3168 | 3168 | 3168 |
| CPU running time (seconds) | 0.064 | 0.032 | 0.047 | 0.032 |
| optimal solution | (2, 2, 2) | (2, 2, 5) | (2, 5, 2) | (2, 5, 5) |
| optimal value | 8.828 | 10.47 | 11.83 | 13.47 |

| subprogram | SP(5) | SP(6) | SP(7) | SP(8) |
|---|---|---|---|---|
| number of discrete variables | 36 | 36 | 36 | 39 |
| number of continuous variables | 149 | 149 | 149 | 163 |
| number of constraints | 3387 | 3387 | 3387 | 3874 |
| CPU running time (seconds) | 0.064 | 0.054 | 0.047 | 0.064 |
| optimal solution | (5, 2, 2) | (5, 2, 5) | (5, 5, 2) | (5, 5, 5) |
| optimal value | 14.83 | 16.47 | 17.83 | 19.47 |

Test 3 (using more Subprograms to Test):

Step 1. Suppose there are 27 available processors, i.e., A=27.

Step 2. Divide each $x_i$ into 3 clusters. In Enumeration Method, let the clusters be [2,3,4,5,6,7,8,9], [10,11,12, 13,14,15,16] and [17,18,19,20,21,22,23,24]. In PARA235, let the clusters be [2,4,8,16,3,9,6,12,18,24], [5,10,20,15,7,14,21], and [11,22,13,17,19,23] and generate subprograms.

Step 3. Solve 27 subprograms by both methods.

The best solutions found in the 27 subprograms for both methods are described in Table 13. It illustrates that both methods find the exact optimal solution. Both the enumeration method and PARA235 take the minimum weight 8.828 while $(x_1,x_2,x_3)=(2,2,2)$. However, PARA235 is faster (approximately 2× faster) since it involves fewer continuous variables and constraints.

TABLE 13

| | Enumeration | PARA235 |
|---|---|---|
| max number of discrete variables | 30 | 33 |
| max number of continuous variables | 196 | 144 |
| max number of constraints | 2052 | 1338 |
| max CPU running time (seconds) | 0.064 | 0.032 |
| optimal solution | (2, 2, 2) | (2, 2, 2) |
| optimal value | 8.828 | 8.828 |

Figure 4:
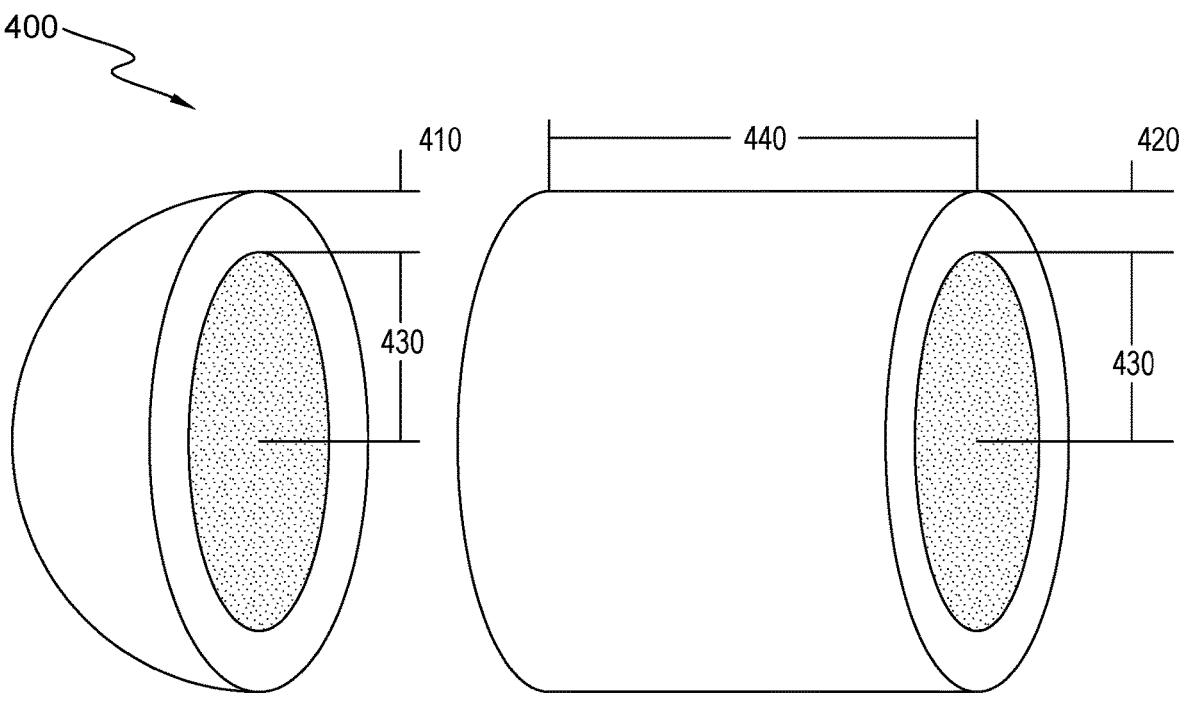
FIG. 4 illustrates a pressure vessel optimization problem, usable with one or more aspects of the present invention.

A second example involes a well known pressure vessel optimization problem. To design the pressure vessel 400 as depicted in FIG. 4, an engineer decides the values of the spherical head thickness 410, the shell thickness 420, the radius 430, and the length of the spherical head thickness 440. The objective is to minimize the manufacturing cost subject to the constraints such as tolerable pressure and feasible sizes. For the case that 410, 420, 430, and 440 are continuous variables, this problem has been discussed in the literature. For the purposes of demonstration, this problem is modified as a mixed discrete problem where $x_1$ (spherical head thickness 410), $x_2$ (shell thickness 420), $x_3$ (radius 430), and $x_4$ (length 440) are discrete variables. The modified vessel design problem can be expressed as:

Program 2

$$\text{Min } obj = 0.6224x_1x_3x_4 + 1.7781x_2x_3^2 + 3.1661x_1^2x_4 + 19.84x_1^2x_3$$

$$\text{s.t. } -x_1 + 0.0193x_3 \le 0,$$

$$-\pi x_3^2 x_4 - \frac{4}{3}\pi x_3^3 + 1,296,000 \le 0,$$

$$-x_2 + 0.00954x_3 \le 0,$$

$$\text{where } x_1, x_2 \in \{0.02, 0.025, 0.03, 0.035, \ldots, 0.085, 0.09, 0.095, 0.1\},$$

$$x_3, x_4 \in \{2, 2.5, 3, 3.5, \ldots, 8.5, 9, 9.5, 10\}.$$

In this case, the cross terms are $$x_1^2x_3, x_1^2x_4, x_2x_3^2, x_3^2x_4, x_1x_3x_4.$$

Examples of the solving processes are given below:

Step 1. Let $x'_1=200x_1$, $x'_2=200x_2$, $x'_3=2x_2$ and $x'_4=2x_2$, the original program becomes:

$$\text{min } 0.000778x'_1x'_3x'_4 + 0.002223x'_2x_3'^2 + 0.00003958x_1'^2x'_4 + 0.000248x_1'^2x'_3$$

$$\text{s.t. } -0.005x'_1 + 0.00965x'_3 \le 0,$$

$$-\frac{\pi}{8}x_3'^2x'_4 - \frac{1}{6}\pi x_3'^3 + 1296000 \le 0,$$

$$-0.005x'_2 + 0.00477x'_3 \le 0,$$

$$\text{where } x'_1, x'_2, x'_3, x'_4 \in \{4, 5, 6, 7, \ldots 17, 18, 19, 20\}.$$

Step 2. Reformulation.

Step 3. Suppose there are 81 available processors, i.e., A=81.

Step 4. Divide each xi into 3 clusters. In Enumeration Method, let the clusters be [4,5,6,7,8,9], [10,11,12,13, 14,15] and [16,17,18,19,20]. In PARA235, let the clusters as [4,8,16,6,9,12,18], [5,10,20,15,7,14] and [11,13, 17,19], and then generate subprograms.

Step 5. Solving 27 subprograms by both methods; formed are $3^4$=81 subprograms.

The optimal solutions, shown in Table 14 for $(x_1,x_2,x_3,)$ =(0.1,0.08,8.5,10) units, and the minimum cost is 17.57. Both enumeration method and our PARA235 find the same solution but have different CPU running times, PARA235 using only one quarter of the CPU running time of the enumeration method. In other words, the enumeration method takes about 4× longer to run than PARA235.

TABLE 14

|  | Enumeration | PARA235 |
|---|---|---|
| max number of discrete variables | 18 | 21 |
| max number of continuous variables | 366 | 113 |
| max number of constraints | 1742 | 405 |
| max CPU running time (seconds) | 0.064 | 0.016 |
| optimal solution | (0.1, 0.08, 8.5, 10) | (0.1, 0.08, 8.5, 10) |
| optimal value | 17.57 | 17.57 |

Figure 5:
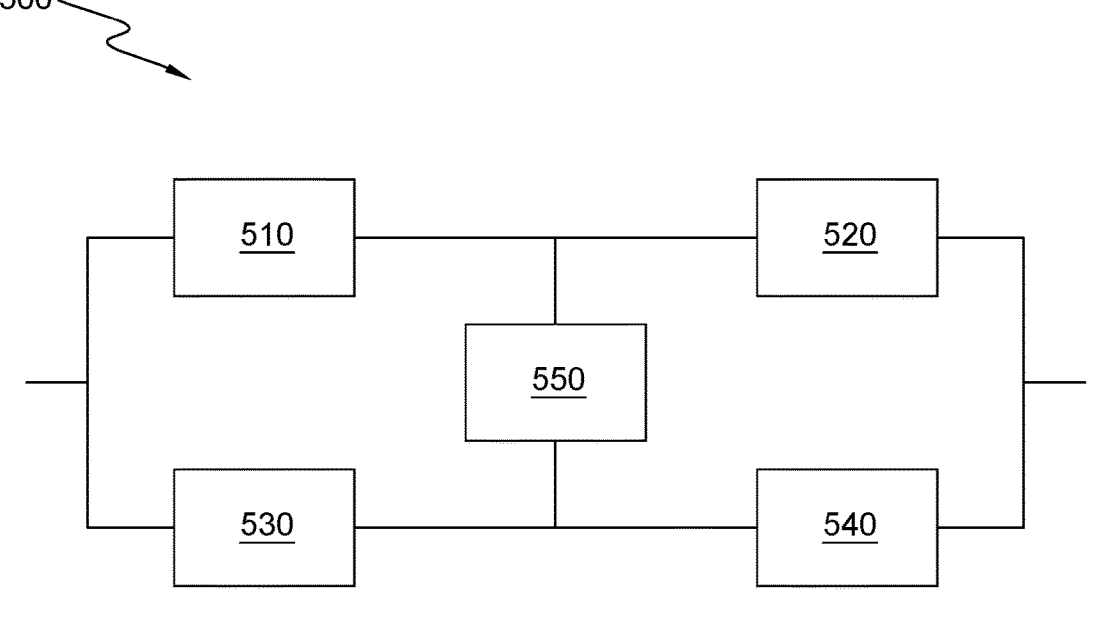
FIG. 5 illustrates a reliability design problem, usable with one or more aspects of the present invention.

A third example invlolves a reliability design problem. Consider a five-node complex system 500, as shown in FIG. 5. The problem is called the "bridge reliability network problem." The system can operate successfully as long as one of the two paths, 510/520 or 530/540, is working, no matter whether node 550 is up or down. However, if the pair of nodes 510 and 540 or the pair of nodes 520 and 530 fail, then node 550 plays a vital role in the system's reliability. Let $x_i$ denote the reliability of ith node for i=1,2, ,5, $u_{i(l)}$ denote the indicator of the i-th node at the l-th reliability level, so the optimization problem becomes:

Program 3

$$\text{Max } obj = x_1 x_2 + x_3 x_4 + x_1 x_4 x_5 + x_2 x_3 x_5 - x_1 x_2 x_3 x_4 - \quad (6)$$

$$x_1 x_2 x_4 x_5 - x_1 x_3 x_4 x_5 - x_1 x_2 x_3 x_5 - x_2 x_3 x_4 x_5 + 2 x_1 x_2 x_3 x_4 x_5$$

$$\text{s.t. } \sum_{i=1}^{5} (2u_{i(1)} + 3u_{i(2)} + 5u_{i(3)} + 8u_{i(4)} + 4u_{i(5)} +$$

$$7u_{i(6)} + 6u_{i(7)} + 15u_{i(8)} + 12u_{i(9)} + 9u_{i(10)} + 10u_{i(11)} +$$

$$13u_{i(12)} + 11u_{i(13)} + 18u_{i(14)} + 16u_{i(15)} + 11u_{i(16)}) \leq 50,$$

$$x_i = 0.1u_{i(1)} + 0.2u_{i(2)} + 0.25u_{i(3)} + 0.3u_{i(4)} + 0.35u_{i(5)} + 0.4u_{i(6)} +$$

$$0.45u_{i(7)} + 0.5u_{i(8)} + 0.55u_{i(9)} + 0.6u_{i(10)} + 0.65u_{i(11)} + 0.7u_{i(12)} +$$

$$0.75u_{i(13)} + 0.8u_{i(14)} + 0.9u_{i(15)} + 1.0u_{i(16)}, i \in \{1, 2, \ldots, 5\},$$

$$u_{i(1)} + u_{i(2)} + u_{i(3)} + u_{i(4)} + u_{i(5)} + u_{i(6)} + u_{i(7)} + u_{i(8)} + u_{i(9)} +$$

$$u_{i(10)} + u_{i(11)} + u_{i(12)} + u_{i(13)} + u_{i(14)} + u_{i(15)} + u_{i(16)} = 1,$$

$$i \in \{1, 2, \ldots, 5\}, u_{i(l)} \in \{0, 1\}, i \in \{1, 2, \ldots, 5\}, l \in \{1, 2, \ldots, 6\}.$$

In this case, the cross terms are $x_1 x_2$, $x_3 x_4$, $x_1 x_4 x_5$, $x_2 x_3 x_5$, $x_1 x_2 x_3 x_4$, $x_1 x_2 x_4 x_5$, $x_2 x_3 x_4 x_5$, $x_1 x_2 x_3 x_5$, $x_2 x_3 x_4 x_5$, $x_1 x_2 x_3 x_4 x_5$.

Test 1 (i.e., the Following Five Steps):
Step 1. Let x'i =20x₁ for i=1,2,3,4,5, the original program becomes $$\text{max } 0.0025 x_1' x_2' + 0.0025 x_3' x_4' + 0.000125 x_1' x_4' x_5' + 0.000125 x_2' x_3' x_5' -$$

$$0.00000625 x_1' x_2' x_3' x_4' - 0.00000625 x_1' x_2' x_4' x_5' - 0.00000625 x_1' x_3' x_4' x_5' -$$

$$0.00000625 x_1' x_2' x_3' x_5' - 0.00000625 x_2' x_3' x_4' x_5' + 0.0000003125 x_1' x_2' x_3' x_4' x_5'$$

s.t.

$$\sum_{i=1}^{5} (2u_{i(1)} + 3u_{i(2)} + 5u_{i(3)} + 8u_{i(4)} + 4u_{i(5)} + 7u_{i(6)} + 6u_{i(7)} + 15u_{i(8)} + 12u_{i(9)} +$$

$$9u_{i(10)} + 10u_{i(11)} + 13u_{i(12)} + 11u_{i(13)} + 18u_{i(14)} + 16u_{i(15)} + 11u_{i(16)}) \leq 50,$$

$$0.05 x_i' = 0.1u_{i(1)} + 0.2u_{i(2)} + 0.25u_{i(3)} + 0.3u_{i(4)} + 0.35u_{i(5)} + 0.4u_{i(6)} +$$

$$0.45u_{i(7)} + 0.5u_{i(8)} + 0.55u_{i(9)} + 0.6u_{i(10)} + 0.65u_{i(11)} + 0.7u_{i(12)} +$$

$$0.75u_{i(13)} + 0.8u_{i(14)} + 0.9u_{i(15)} + 1.0u_{i(16)}, i \in \{1, 2, \ldots, 5\},$$

$$u_{i(1)} + u_{i(2)} + u_{i(3)} + u_{i(4)} + u_{i(5)} + u_{i(6)} + u_{i(7)} + u_{i(8)} + u_{i(9)} + u_{i(10)} +$$

$$u_{i(11)} + u_{i(12)} + u_{i(13)} + u_{i(14)} + u_{i(15)} + u_{i(16)} = 1, i \in \{1, 2, \ldots, 5\},$$

$$u_{i(l)} \in \{0, 1\}, i \in \{1, 2, \ldots 5\}, l \in \{1, 2, \ldots, 6\}.$$

$$x_i' \in \{2, 4, 5, 6, 7, 8, 9, 10, 11, 12, 13, 14, 15, 16, 18, 20\}, i \in \{1, 2, 3, 4, 5\}$$

Step 2. Reformulation.
Step 3. Suppose there are $2^5$=32 available processors, i.e., A=32.
Step 4. Divide each x'$_i$ into two clusters. In the Enumeration Method, let the clusters be [2,4,5,6,7,8,9,10] abd [11,12,13,14,15,16,18,20]. In PARA235, let the clusters be [2,4,8,16,6,9,12,18] and [5,10,15,20,7,14,11, 13]. Next are formed $2^5$=32 subprograms.
Step 5. Check the feasibility of the subprograms.
Step 6. Solving these 32 subprograms, the results are in Table 15. The optimal values for the 5 resistors $(x_1,x_2, x_3,x_4,x_5)$=(3,2,4,10,8) units, and the maximum reliability level 1678 units. Both Enumeration method and our PARA235 find the same solution but uses a strikingly lower maximum CPU running time than the enumeration method (0.35 seconds vs. 9.42 seconds, respectively).

TABLE 15

|  | Enumeration | PARA235 |
|---|---|---|
| max number of discrete variables | 40 | 40 |
| max number of continuous variables | 45862 | 17499 |
| max number of constraints | 49658 | 19678 |
| max CPU running time (seconds) | 9.42 | 0.35 |
| optimal solution | (3, 2, 4, 10, 8) | (3, 2, 4, 10, 8) |
| optimal value | 1678 | 1678 |

These three cases illustrate clearly that: PARA235 can find the same globally optimal solution of the original main program; and PARA235 is significantly faster (almost 27× faster) than the Enumeration Method, as it uses fewer continuous variables and constraints.

In one or more aspects in accordance with the present invention, a computer-implemented method of facilitating processing within a computing environment is provided. The method includes, for example, receiving a main program representing one Engineering Design Optimization Problem (EDOP). The EDOP includes, for example, polynomial terms with product values. The method further includes, for example, identifying a number (N) of available parallel processors for parallel processing. Further, the method includes, for example, partitioning the main program into N subprograms, N being a positive integer greater than one. In one example, the partitioning is pdme-number based. The method further includes, for example, solving, by each of the available parallel processors independent of any other processor, a unique subprogram of the N subprograms, resulting in N unique solutions. Further, the method may include, for example, automatically choosing a best solution from among the N unique solutions and automatically applying the best solution to the EDOP.

In one or more aspects in accordance with the present invention, the computer-implemented method includes, for example, one or more central processors for performing the partitioning and, prior to the solving, assigning each of the N subprograms to one of the N available parallel processors.

In one or more aspects in accordance with the present invention, at least one of the polynomial terms includes one or more variable of at least order two.

In one or more aspects in accordance with the present invention, the solving aspect of the computer-implemented method may be performed, for example, while refraining from communications among the N available parallel processors.

In one or more aspects in accordance with the present invention, the computer-implemented method may futher include, for example, one or more central processors and the solving aspect may be performed while refraining from communication between the central processor and any of the N available parallel processors.

In one or more aspects in accordance with the present invention, the N available parallel processors of the computer-implemented method may include at least one virtual processor.

In one or more aspects in accordance with the present invention, the number of parallel processors may be predetermined.

In one or more aspects in accordance with the present invention, the solving aspect of the computer-implemented method may include, for example, encoding each of the N subprograms as a linear mixed integer program, resulting in N encoded subprograms, and solving the N encoded subprograms in parallel and each independently.

In one or more aspects in accordance with the present invention, the product values of the computer-implemented method may include, for example, at least one product value of at least order two, the method further including linearizing one or more function of the EDOP.

In one or more aspects in accordance with the present invention, a computer system is provided for facilitating processing within a computing environment. The computer system includes, for example, a memory, at least one processor in communication with the memory and program instructions executable by one or more processor via the memory to perform a method. The method includes, for example, receiving a main program representing one Engineering Design Optimization Problem (EDOP), the EDOP including, for example, polynomial terms with product values. Futher, the method includes, for example, identifying a number (N) of available parallel processors for parallel processing. The method also includes, for example, partitioning the main program into N subprograms, wherein N is a positive integer greater than one, and wherein the partitioning is prime-number based. Further, the method includes, for example, solving, by each of the available parallel processors independent of any other processsor, a unique subprogram of the N subprograms, the solving resulting in N unique solutions. The method further includes, for example, automatically choosing a best solution from among the N unique solutions and automatically applying the best solution to the EDOP.

In one or more aspects in accordance with the present invention, the computer system include, for example, one or more central processors for performing the partitioning and, prior to the solving, assigning each of the N subprograms to one of the N available parallel processors.

In one or more aspects in accordance with the present invention, the computer system may include, for example, at least one of the polynomial terms including one or more variable of at least order two.

In one or more aspects in accordance with the present invention, the solving aspect may be performed, for example, while refraining from communications among the N available parallel processors.

In one or more aspects in accordance with the present invention, the computer system may further include, for example, one or more central processors and the solving may be performed, for example, while also refraining from communication between the central processors and any of the N available parallel processors.

In one or more aspects in accordance with the present invention, the N available parallel processors may include, for example, at least one virtual processor.

In one or more aspects in accordance with the present invention, the number N may be predetermined.

In one or more aspects in accordance with the present invention, the solving aspect may include, for example, encoding each of the N subprograms as a linear mixed integer program resulting in N encoded subprograms and solving the N encoded subprograms in parallel and each independently.

In one or more aspects in accordance with the present invention, the product values may include, for example, at least one product value of at least order two, the system further comprising linearizing one or more function of the EDOP.

In one or more aspects in accordance with the present invention, a computer program product for facilitating processing within a computing environment is provided. The computer program product includes, for example, one or more computer-readable storage media having program instructions embodied therewith, the program instructions being readable by one or more processing circuit to cause the one or more processing circuit to perform a method. The method includes, for example, receiving a main program representing one Engineering Design Optimization Problem (EDOP). The EDOP includes, for example, polynomial terms with product values. The method further includes, for example, identifying a number (N) of available parallel processors for parallel processing. Further, the method includes, for example, partitioning the main program into N subprograms, N being a positive integer greater than one. In one example, the partitioning is prime-number based. The method further includes, for example, solving, by each of the available parallel processors independent of any other processor, a unique subprogram of the N subprograms, resulting in N unique solutions. Further, the method may include, for example, automatically choosing a best solution from among the N unique solutions and automatically applying the best solution to the EDOP.

In one or more aspects in accordance with the present invention, the product may include one or more central processor for performing the partitioning and, prior to the solving, assigning each of the N subprograms to one of the N available parallel processors.

In one or more aspects in accordance with the present invention, at least one of the polynomial terms includes one or more variable of at least order two.

In one or more aspects in accordance with the present invention, the solving aspect may be performed, for example, while refraining from communications among the N available parallel processors.

In one or more aspects in accordance with the present invention, the method of the computer program product may further include, for example, one or more central processors and the solving aspect may be performed while also refraining from communication between the central processor and any of the N available parallel processors.

In one or more aspects in accordance with the present invention, the N available parallel processors may include at least one virtual processor.

In one or more aspects in accordance with the present invention, the number N of parallel processors may be predetermined.

In one or more aspects in accordance with the present invention, the solving aspect may include, for example, encoding each of the N subprograms as a linear mixed integer program, resulting in N encoded subprograms, and solving the N encoded subprograms in parallel and each independently.

In one or more aspects in accordance with the present invention, the product values of the method of the computer program product may include, for example, at least one product value of at least order two, the method further including linearizing one or more functions of the EDOP.

One or more aspects of the present invention are inextricably tied to computer technology and facilitate processing within a computer, improving performance thereof. The use of a process to transform code to execute faster improves performance of the code and the computing environment.

Although embodiments are described herein, other variations and/or embodiments are possible.

Figures 6, 7:
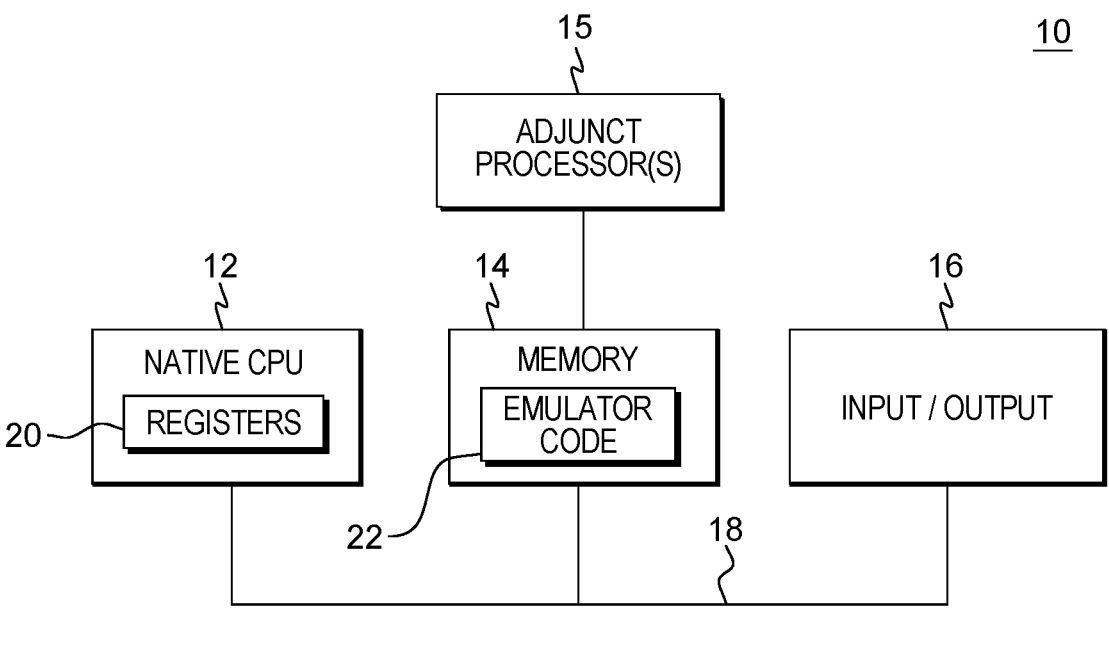
FIG. 6 depicts another example of a computing environment to incorporate and/or use one or more aspects of the present invention.
FIG. 7 depicts further details of the memory of FIG. 6, in accordance with one or more aspects of the present invention.

Another example of a computing environment to incorporate and/or use one or more aspects of the present invention is described with reference to FIG. 6. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Further details relating to emulator code 22 are described with reference to FIG. 7. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to perform a multiphase idiom recognition process, transform code to include faster code, and/or perform one or more other aspects of the present invention.

Although various embodiments are described herein, many variations and other embodiments are possible without departing from a spirit of aspects of the present invention. It should be noted that, unless otherwise inconsistent, each aspects or feature described herein, and variants thereof, may be combinable with any other aspects or feature.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspects, an application may be deployed for performing one or more embodiments. As one example, the deploying of an application comprises providing computer infrastructure operable to perform one or more embodiments.

As a further aspects, a computing infrastructure may be deployed comprising integrating computer readable code into a computing system, in which the code in combination with the computing system is capable of performing one or more embodiments.

As yet a further aspects, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different idioms and/or different types of optimizers, pattern matching techniques, constraint analysis, transformation and/or optimizations may be employed. Many variations are possible.

Various aspects are described herein. Further, many variations are possible without departing from a spirit of aspects of the present invention. It should be noted that, unless otherwise inconsistent, each aspects or feature described herein, and variants thereof, may be combinable with any other aspects or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

receiving a main program representing one Engineering Design Optimization Problem (EDOP), wherein the one EDOP comprises polynomial terms with product values;

identifying a number (N) of available parallel processors for parallel processing;

partitioning the main program into N subprograms, wherein N is a positive integer greater than one, wherein the partitioning is prime-number based and wherein the polynomial terms are linearized;

solving, by each of the available parallel processors independent of any other processor, a unique subprogram of the N subprograms, the solving resulting in N unique solutions;

automatically choosing a solution from among the N unique solutions that satisfies a predetermined objective; and automatically applying the chosen solution to the EDOP.

2. The computer-implemented method of claim 1, further comprising one or more central processor for performing the partitioning and, prior to the solving, assigning each of the N subprograms to one of the N available parallel processors.

3. The computer-implemented method of claim 1, wherein at least one of the polynomial terms comprises one or more variables of at least order two.

4. The computer-implemented method of claim 1, wherein the solving is performed while refraining from communications among the N available parallel processors.

5. The computer-implemented method of claim 4, further comprising one or more central processors and wherein the solving is performed while also refraining from communication between the central processor and any of the N available parallel processors.

6. The computer-implemented method of claim 1, wherein the N available parallel processors comprises at least one virtual processor.

7. The computer-implemented method of claim 1, wherein N is predetermined.

8. The computer-implemented method of claim 1, wherein the solving comprises:

encoding each of the N subprograms as a linear mixed integer program, resulting in N encoded subprograms; and solving the N encoded subprograms in parallel and each independently.

9. The computer-implemented method of claim 1, wherein the product values comprise at least one product value of at least order two, the method further comprising linearizing one or more functions of the EDOP.

10. A computer system for facilitating processing within a computing environment, the computer system comprising:
a memory;
at least one processor in communication with the memory; and
program instructions executable by one or more processor via the memory to perform a method, the method comprising:
receiving a main program representing one Engineering Design Optimization Problem (EDOP), wherein the one EDOP comprises polynomial terms with product values;
identifying a number (N) of available parallel processors for parallel processing;
partitioning the main program into N subprograms, wherein N is a positive integer greater than one, and wherein the partitioning is prime-number based;
solving, by each of the available parallel processors independent of any other processor, a unique subprogram of the N subprograms, the solving resulting in N unique solutions;
automatically choosing a solution from among the N unique solutions that satisfies a predetermined objective; and
automatically applying the chosen solution to the EDOP.

11. The computer system of claim 10, further comprising one or more central processor for performing the partitioning and, prior to the solving, assigning each of the N subprograms to one of the N available parallel processors.

12. The computer system of claim 10, wherein at least one of the polynomial terms comprises one or more variable of at least order two.

13. The computer system of claim 10, wherein the solving is performed while refraining from communications among the N available parallel processors.

14. The computer system of claim 13, further comprising one or more central processors and wherein the solving is performed while also refraining from communication between the central processor and any of the N available parallel processors.

15. The computer system of claim 10, wherein the N available parallel processors comprise at least one virtual processor.

16. The computer system of claim 10, wherein N is predetermined.

17. The computer system of claim 10, wherein the solving comprises:
encoding each of the N subprograms as a linear mixed integer program, resulting in N encoded subprograms; and
solving the N encoded subprograms in parallel and each independently.

18. The computer system of claim 10, wherein the product values comprise at least one product value of at least order-two, the method further comprising linearizing one or more function of the EDOP.

19. A computer program product for facilitating processing within a computing environment, the computer program product comprising:
one or more computer-readable storage media having program instructions embodied therewith, the program instructions being readable by one or more processing circuit to cause the one or more processing circuit to perform a method comprising:
receiving a main program representing one Engineering Design Optimization Problem (EDOP), wherein the one EDOP comprises polynomial terms with product values;
identifying a number (N) of available parallel processors for parallel processing;
partitioning the main program into N subprograms, wherein N is a positive integer greater than one, and wherein the partitioning is prime-number based;
solving, by each of the available parallel processors independent of any other processor, a unique subprogram of the N subprograms, the solving resulting in N unique solutions;
automatically choosing a solution from among the N unique solutions that satisfies a predetermined objective; and
automatically applying the chosen solution to the EDOP.

20. The computer program product of claim 19, further comprising one or more central processor for performing the partitioning and, prior to the solving, assigning each of the N subprograms to one of the N available parallel processors.

21. The computer program product of claim 19, wherein at least one of the polynomial terms comprises one or more variable of at least order two.

22. The computer program product of claim 19, wherein the solving is performed while refraining from communications among the N available parallel processors.

23. The computer program product of claim 22, further comprising a central processor and wherein the solving is performed while also refraining from communication between the central processor and any of the N available parallel processors.

24. The computer program product of claim 19, wherein the N available parallel processors comprise at least one virtual processor.

25. The computer program product of claim 19, wherein N is predetermined.

26. The computer program product of claim 19, wherein the solving comprises:
encoding each of the N subprograms as a linear mixed integer program, resulting in N encoded subprograms; and
solving the N encoded subprograms in parallel and each independently.

27. The computer program product of claim 19, wherein the product values comprise at least one product value of at least order-two, the method further comprising linearizing one or more function of the EDOP.

* * * * *